(12) United States Patent
Iijima

(10) Patent No.: US 8,819,475 B2
(45) Date of Patent: Aug. 26, 2014

(54) MEMORY ACCESS CIRCUIT AND MEMORY ACCESS SYSTEM

(75) Inventor: Hiroaki Iijima, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 285 days.

(21) Appl. No.: 13/425,338

(22) Filed: Mar. 20, 2012

(65) Prior Publication Data

US 2012/0311372 A1 Dec. 6, 2012

(30) Foreign Application Priority Data

May 30, 2011 (JP) .................................. 2011-120668

(51) Int. Cl.
*G06F 1/08* (2006.01)
*G06F 1/12* (2006.01)
*G06F 1/10* (2006.01)

(52) U.S. Cl.
CPC ... *G06F 1/08* (2013.01); *G06F 1/12* (2013.01); *G06F 1/10* (2013.01)
USPC .......................................................... 713/503

(58) Field of Classification Search
CPC ................. G06F 1/08; G06F 1/10; G06F 1/12
USPC .......................................................... 713/503
See application file for complete search history.

(56) References Cited

U.S. PATENT DOCUMENTS

| | | | |
|---|---|---|---|
| 7,003,686 B2 * | 2/2006 | Chua-Eoan et al. | 713/600 |
| 7,043,652 B2 | 5/2006 | Matsui | |
| 7,472,304 B2 | 12/2008 | Malekkhosravi et al. | |
| 2007/0240012 A1 * | 10/2007 | Burney et al. | 713/500 |
| 2010/0237914 A1 | 9/2010 | Katoh | |
| 2011/0141834 A1 * | 6/2011 | Sugishita | 365/193 |
| 2011/0314214 A1 * | 12/2011 | Wei et al. | 711/106 |
| 2012/0188833 A1 | 7/2012 | Yamahara et al. | |

FOREIGN PATENT DOCUMENTS

| | | |
|---|---|---|
| JP | 2003-050738 | 2/2003 |
| JP | 2005-142859 | 6/2005 |
| JP | 2010-503068 | 3/2008 |
| JP | 2010-206747 | 9/2010 |
| JP | 2010-224717 | 10/2010 |

OTHER PUBLICATIONS

Japanese Office Action for corresponding Japanese Application No. 2011-120668, mailed Feb. 28, 2014 in 10 pages.

* cited by examiner

*Primary Examiner* — Thomas Lee
*Assistant Examiner* — Danny Chan
(74) *Attorney, Agent, or Firm* — Knobbe, Martens, Olson & Bear, LLP

(57) ABSTRACT

According to one embodiment, a memory access circuit includes a PLL, a phy-clock tree, first, second, and master DLLs, and first and second PDs. The PLL generates a PLL output locked to a reference frequency. The phy-clock tree delays the PLL output and generates a reference clock signal. The first DLL corrects a clock skew between reference and system clock signals, and generates a source of the system clock signal. The second DLL corrects a clock skew between reference clock and phy-clock signals, and generates a source of the phy-clock signal. The first and second PDs detect a phase difference, and generate first and second detection signals. The master DLL counts the reference clock signal and generates a delay correction signal. The first and second DLLs determine a correction direction and a correction amount based on first and second detection and delay correction signals, respectively.

20 Claims, 11 Drawing Sheets

MEMORY ACCESS CIRCUIT AND MEMORY ACCESS SYSTEM

CROSS REFERENCE TO RELATED APPLICATION(S)

This application is based upon and claims the benefit of priority from the prior Japanese Patent Application No. 2011-120668, filed on May 30, 2011, the entire contents of which are incorporated herein by reference.

FIELD

Embodiments described herein relate generally to a memory access circuit and a memory access system.

BACKGROUND

A memory having a parallel interface such as a DRAM (Dynamic Random Access Memory) is recently being used in various systems. Such system includes a memory access circuit for controlling the access which a processor such as a CPU (Central Processing Unit) performs to a memory.

A typical memory access circuit includes a phase adjusting element for correcting a clock skew. The phase adjusting element is a PLL (phase locked loop) or a DLL (delay locked loop).

The PLL, however, has a large circuit scale and a large power consumption. Therefore, if the clock skew is corrected by using the PLL, the circuit scale and the power consumption of the memory access circuit increase.

Furthermore, the DLL generates a jitter when a signal is propagated through a delay element. This jitter becomes greater as the phase adjustment amount approaches 360 degrees. Therefore, if the clock skew is corrected by using the DLL, a timing margin reduces.

DETAILED DESCRIPTION

Embodiments will now be explained with reference to the accompanying drawings.

In general, according to one embodiment, a memory access circuit is connected to a memory including a parallel interface and a system circuit configured to issue a memory access command to command access to the memory. The circuit includes a phase locked loop, a first phy-clock tree, a first delay locked loop, a second delay locked loop, a first phase detector, a second phase detector, and a master delay locked loop. The phase locked loop generates a PLL (Phase Locked Loop) output locked to a reference frequency of a reference signal. The first phy-clock tree delays the PLL output and generates a reference clock signal. The first delay locked loop corrects a clock skew between the reference clock signal and a system clock signal generated by the system circuit, and generates a source signal of the system clock signal. The second delay locked loop corrects a clock skew between the reference clock signal and a phy-clock signal used in the memory access circuit, and generates a source signal of the phy-clock signal. The first phase detector detects a phase difference between the system clock signal and the phy-clock signal, and generates a first detection signal corresponding to the phase difference. The second phase detector detects a phase difference between the system clock signal and the phy-clock signal, and generates a second detection signal corresponding to the phase difference. The master delay locked loop counts the reference clock signal and generates a delay correction signal. The first delay locked loop determines a correction direction and a correction amount based on the first detection signal and the delay correction signal, respectively. The second delay locked loop determines a correction direction and a correction amount based on the second detection signal and the delay correction signal, respectively.

Figure 1:
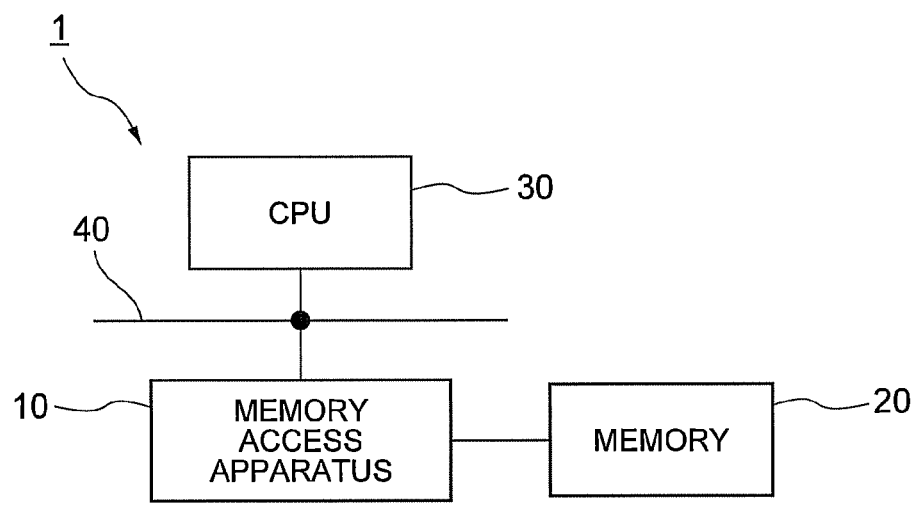
FIG. 1 is a block diagram of a memory access system 1 of the present embodiment.

A configuration of a memory access system of the present embodiment will be described. FIG. 1 is a block diagram of a memory access system 1 of the present embodiment.

The memory access system 1 includes a memory access apparatus 10, a memory 20, a CPU (Central Processing Unit) 30, and a bus 40.

The CPU 30 is a module that starts up a predetermined application to execute data processing on data stored in the memory 20. For example, the CPU 30 reads out data from the memory 20, executes the data processing on the read data based on a command of the application, and writes the execution result of the data processing in the memory 20. The CPU 30 also issues a request requesting for the memory access to read out the data from the memory 20.

The memory access apparatus 10 is an apparatus that controls the memory access. The memory access apparatus 10 is connected to the CPU 30 via the bus 40, and is connected to the memory 20 without interposing the bus 40. The memory access apparatus 10 controls the memory access based on the request issued by the CPU 30.

The memory 20 is a storage medium such as DRAM that has a parallel interface. In the memory 20, various data is stored.

Figure 2:
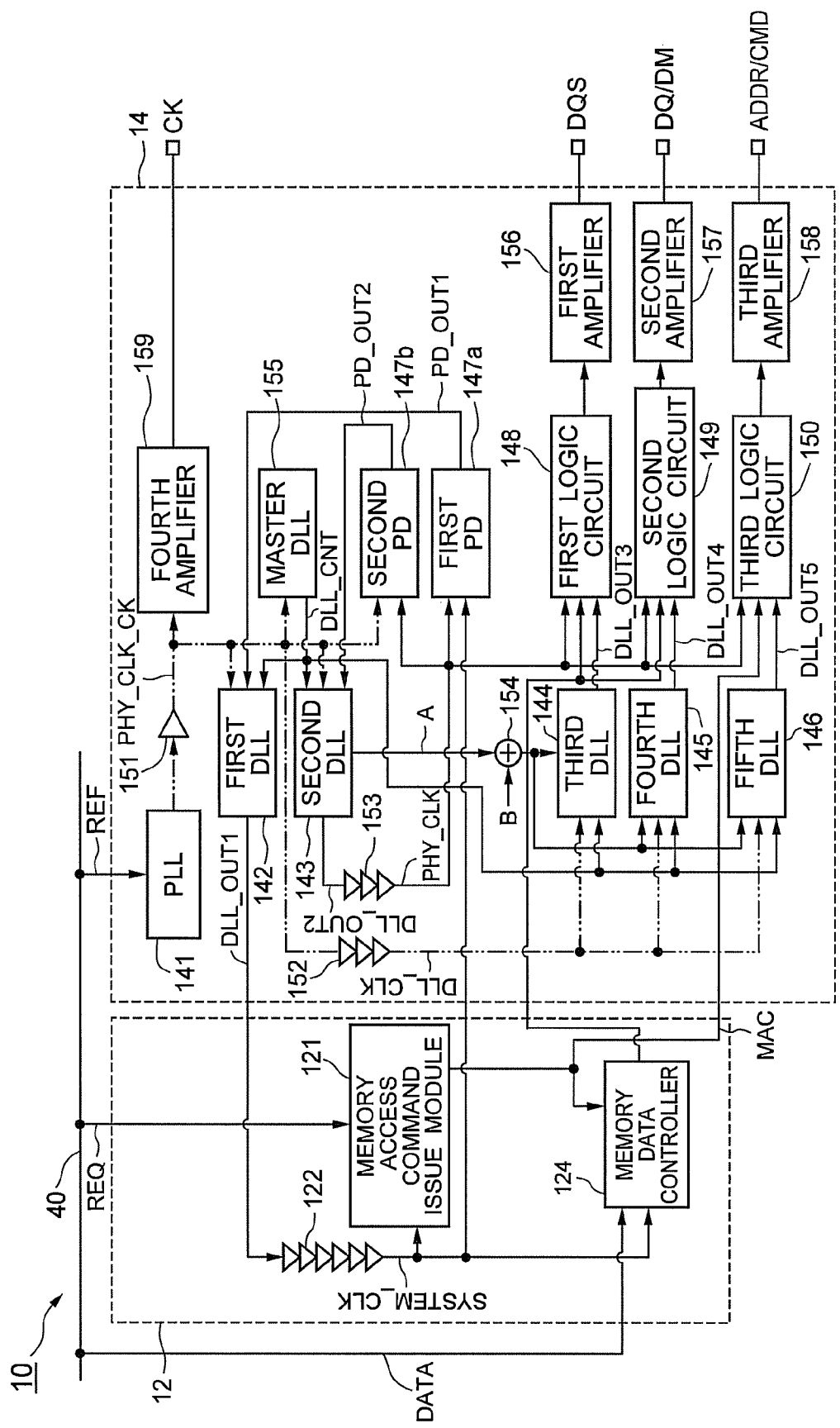
FIG. 2 is a configuration diagram of the memory access apparatus 10 of the present embodiment.

A configuration of the memory access apparatus of the present embodiment will be described. FIG. 2 is a configuration diagram of the memory access apparatus 10 of the present embodiment.

As shown in FIG. 2, the memory access apparatus 10 includes a system circuit 12 and a memory access circuit 14.

The memory access circuit 14 is connected to the memory 20 and the system circuit 12.

The system circuit 12 is a circuit that issues a memory access command (MAC). The system circuit 12 includes a memory access command issue module 121, a system clock tree 122, and a memory data controller 124.

The memory access circuit 14 is a circuit that controls the memory access. The memory access circuit 14 includes a PLL 141, a first DLL 142 to a fifth DLL 146, a first PD (phase detector) 147a and a second PD 147b, a first logic circuit 148 to a third logic circuit 150, a first phy-clock tree 151 to a third phy-clock tree 153, a set angle calculating module 154, a master DLL 155, and a first amplifier 156 to a fourth amplifier 159. The number of DLL is not limited to six. In other words, the memory access circuit 14 may have six or more DLLs. The number of memory access command issue module 121 and the first logic circuit 148 to the third logic circuit 150 is arbitrary.

The memory access command issue module 121 is a module that issues the memory access command (MAC) commanding an access to the memory 20. For example, the memory access command issue module 121 receives a request (REQ) transferred via the bus 40 and a system clock signal (SYSTEM_CLK), and issues the memory access command (MAC) based on the received request (REQ) and system clock signal (SYSTEM_CLK).

The memory data controller 124 outputs the data (DATA) inputted from the bus 40 to the first logic circuit 148 and the second logic circuit 149 in accordance with the memory access command (MAC) issued by the memory access command issue module 121.

The PLL 141 is a circuit that detects a phase difference between an arbitrary reference frequency and a PLL output, and generates the PLL output which is locked to the reference frequency based on the detected phase difference. The reference frequency is obtained by gradually multiplying a frequency of a reference signal (REF). The PLL output is an output signal of the PLL 141 and a source signal of the reference clock signal (PHY_CLK_CK).

The first phy-clock tree 151 is a module that delays the PLL output by a predetermined first clock tree length TL1 to generate the reference clock signal (PHY_CLK_CK). The reference clock signal (PHY_CLK_CK) has a frequency obtained by gradually multiplying the reference frequency. The reference clock signal (PHY_CLK_CK) is a source signal (that is, source clock of memory 20) of the timing control signal for controlling the operation timing of the memory 20, and thus the reference clock signal (PHY_CLK_CK) is a signal of highest priority to reduce the clock jitter among the signals used in the memory access circuit 14 and is transmitted with a wiring having the shortest wiring length.

The master DLL 155 is a circuit that generates a delay correction signal (DLL_CNT) used for the correction of the clock skew and the setting of the phase angle. For example the master DLL 155 receives the reference clock signal (PHY_CLK_CK), counts the clock of the received reference clock signal (PHY_CLK_CK), and generates the delay correction signal (DLL_CNT). The delay correction signal (DLL_CNT) is a signal indicating the number of delay elements corresponding to a period of one cycle of the reference clock signal. In other word, the delay correction signal (DLL_CNT) becomes a reference of the correction amount $\Delta C$ and the phase angle.

The first DLL 142 is a clock deskew circuit that corrects the clock skew between the reference clock signal (PHY_CLK_CK) and the system clock signal (SYSTEM_CLK). The system clock signal (SYSTEM_CLK) is a signal generated by the system clock tree 122. The first DLL 142 receives the reference clock signal (PHY_CLK_CK), a first PD output (PD_OUT1) which is the output of the first PD147a, and the delay correction signal (DLL_CNT), determines the correction direction based on the first PD output (PD_OUT1), determines the correction amount $\Delta C2$ based on the delay correction signal (DLL_CNT), delays the reference clock signal (PHY_CLK_CK) based on the determined correction direction and correction amount $\Delta C2$, and generates the first DLL output (DLL_OUT1). The first DLL output (DLL_OUT1) is a source signal of the system clock signal (SYSTEM_CLK).

The system clock tree 122 is a module that delays the first DLL output (DLL_OUT1) by a predetermined third clock tree length TL3 with respect to the PLL output to generate a system clock signal (SYSTEM_CLK). In other words, the system clock signal (SYSTEM_CLK) is a signal generated based on the first DLL output (DLL_OUT1) in which the clock skew is corrected.

The second phy-clock tree 152 is a module that receives the reference clock signal (PHY_CLK_CK) and delays the referee clock signal (PHY_CLK_CK) by a predetermined second clock tree length TL2 with respect to the PLL output to generate a DLL clock signal (DLL_CLK). The DLL clock signal (DLL_CLK) is a source signal of a strobe signal (DQS) and a data signal (DQ). The strobe signal (DQS) is one of timing control signal.

The second DLL 143 is a clock deskew circuit that corrects the clock skew between the reference clock signal (PHY_CLK_CK) and the phy-clock signal (PHY_CLK). The phy-clock signal (PHY_CLK) is a signal used in the memory access circuit 14. For example the second DLL 143 receives the reference clock signal (PHY_CLK_CK), the second PD output (PD_OUT2), which is the output of the second PD147b, and the delay correction signal (DLL_CNT), determines the correction direction based on the second PD output (PD_OUT2), determines the correction amount $\Delta C1$ based on the delay correction signal (DLL_CNT), delays the reference clock signal (PHY_CLK_CK) based on the determined correction direction and correction amount $\Delta C1$, and generates the second DLL output (DLL_OUT2). The second DLL output (DLL_OUT2) is a source signal of a phy-clock signal (PHY_CLK). The second DLL 143 also generates a reference angle A corresponding to the correction amount $\Delta C1$.

The third phy-clock tree 153 is a module that receives the second DLL output (DLL_OUT2), and delays the second DLL output (DLL_OUT2) by a predetermined second clock tree length TL2 with respect to the PLL output to generate the phy-clock signal (PHY_CLK). In other words, the phy-clock signal (PHY_CLK) is a signal generated on the basis of the second DLL output (DLL_OUT2) in which the clock skew is corrected. The clock tree length of the phy-clock signal (PHY_CLK) is equal to that of the DLL clock signal (DLL_CLK).

The set angle calculating module 154 is a module that calculates the set angle to be provided to the third DLL 144 to the fifth DLL 146. The set angle is information indicating the phase difference to be set among the strobe signal (DQS), which is the output of the first logic circuit 148, the data signal (DQ) and the data mask signal (DM), which are the outputs of the second logic circuit 149, and the address signal (ADDR) and the command signal (CMD), which are the outputs of the third logic circuit 150. For example, the set angle calculating module 154 adds the reference angle A generated by the second DLL 143 and a predetermined phase angle B generated by a predetermined external circuit such as a system circuit 12 connected to the memory access circuit 14, and outputs the sum of the reference angle A and the phase angle B to the third DLL 144 to the fifth DLL 146 as the set angle. The phase angle B is an angle indicating an arbitrary additional correction amount individually determined by the system circuit 12 for each of the third DLL 144 to the fifth DLL 146, and the phase angle B corresponds to the phase difference to be set among the strobe signal (DQS), the data signal (DQ) and the data mask signal (DM), and the address signal (ADDR) and the command signal (CMD). In other words, the system circuit 12 individually determines the phase angle for the third DLL 144, the phase angle for the fourth DLL 145, and the phase angle for the fifth DLL 146. Incidentally, the phase angle B may include the phase difference to be set between the strobe signal (DQS) and the memory reference signal (CK) in addition to the phase difference to be set among the strobe signal (DQS), the data signal (DQ) and the data mask signal (DM), and the address signal (ADDR) and the command signal (CMD).

Each of the third DLL 144 to the fifth DLL 146 is a clock deskew circuit that corrects the clock skew between the reference clock signal (PHY_CLK_CK) and the DLL clock signal (DLL_CLK). Each of them is also circuits capable of setting an arbitrary phase angle. For example, each of the third DLL 144 to the fifth DLL 146 receives the set angle, the DLL clock signal (DLL_CLK), the delay correction signal (DLL_CNT), and the output signal of the set angle calculating module 154, determines the correction amount based on the set angle and the delay correction signal (DLL_CNT), delays the DLL clock signal (DLL_CLK) based on the determined correction direction and correction amount, and generates the third DLL output (DLL_OUT3) to the fifth DLL output (DLL_OUT5), respectively. The third DLL output (DLL_OUT3) is a source signal of the strobe signal (DQS). The fourth DLL output (DLL_OUT4) is a source signal of the data signal (DQ) and the data mask signal (DM). The fifth DLL output (DLL_OUT5) is a source signal of the address signal (ADDR) and the command signal (CMD).

The second PD 147b is a circuit (for example, flip-flop) that detects the shift between the phase at the clock edge of the phy-clock signal (PHY_CLK) and the phase at the clock edge of the reference clock signal (PHY_CLK_CK). For example, the second PD 147b receives the phy-clock signal (PHY_CLK) and the reference clock signal (PHY_CLK_CK), detects the shift between the clock edge of the phy-clock signal (PHY_CLK) and the clock edge of the reference clock signal (PHY_CLK_CK), and generates a second detection signal (PD_OUT2) indicating the delaying direction of the phy-clock signal (PHY_CLK) with respect to the reference clock signal (PHY_CLK_CK). The second detection signal (PD_OUT2) indicates whether the phy-clock signal (PHY_CLK) is delayed or advanced with respect to the reference clock signal (PHY_CLK_CK). For example, the second detection signal (PD_OUT2) is a signal of one bit corresponding to the phase difference between the phy-clock signal (PHY_CLK) and the reference clock signal (PHY_CLK_CK). In this case, "0" means that the phy-clock signal (PHY_CLK) is delayed with respect to the reference clock signal (PHY_CLK_CK), and "1" means that the phy-clock signal (PHY_CLK) is advanced with respect to the reference clock signal (PHY_CLK_CK).

The first PD 147a is a circuit (for example, flip-flop) that detects the shift between the phase at the clock edge of the phy-clock signal (PHY_CLK) and the phase at the clock edge of the system clock signal (SYSYEM_CLK). For example, the first PD 147a receives the phy-clock signal (PHY_CLK) and the system clock signal (SYSTEM_CLK), detects the shift between the clock edge of the phy-clock signal (PHY_CLK) and the clock edge of the system clock signal (SYSTEM_CLK), and generates a first detection signal (PD_OUT1) indicating the delaying direction of the phy-clock signal (PHY_CLK) with respect to the system clock signal (SYSTEM_CLK). The first detection signal (PD_OUT1) indicates whether the phy-clock signal (PHY_CLK) is delayed or advanced with respect to the system clock signal (SYSTEM_CLK). For example, the first detection signal (PD_OUT1) is a signal of one bit corresponding to the phase difference between the phy-clock signal (PHY_CLK) and the system clock signal (SYSTEM_CLK). In this case, "0" means that the phy-clock signal (PHY_CLK) is delayed with respect to the system clock signal (SYSTEM_CLK), and "1" means that the phy-clock signal (PHY_CLK) is advanced with respect to the system clock signal (SYSTEM_CLK).

The first logic circuit 148 is a circuit that generates the strobe signal (DQS) of the memory 20. For example, the first logic circuit 148 receives the phy-clock signal (PHY_CLK), the data (DATA), and the third DLL output (DLL_OUT3), generates the strobe signal (DQS) from the received signals (that is, the phy-clock signal (PHY_CLK), the data (DATA), and the third DLL output (DLL_OUT3)), and outputs the generated strobe signal (DQS) to the memory 20 via the first amplifier 156. Incidentally, the first logic circuit 148 may be incorporated in the third DLL 144.

The second logic circuit 149 is a circuit that generates the data signal (DQ) and the data mask signal (DM) of the memory 20. For example, the second logic circuit 149 receives the phy-clock signal (PHY_CLK), the data signal (DATA), and the fourth DLL output (DLL_OUT4), generates the data signal (DQ) from the received signals (that is, the phy-clock signal (PHY_CLK), the data signal (DATA), and the fourth DLL output (DLL_OUT4)), and outputs the generated data signal (DQ) to the memory 20 via the second amplifier 157. Incidentally, the second logic circuit 149 may be incorporated in the fourth DLL 145.

The third logic circuit 150 is a circuit that generates the address signal (ADDR) and the command signal (CMD) of the memory 20. For example, the third logic circuit 150 receives the phy-clock signal (PHY_CLK), the memory access command (MAC), and the fifth DLL output (DLL_OUT5), generates the address signal (ADDR) and the command signal (CMD) from the received signals (that is, the phy-clock signal (PHY_CLK), the memory access command (MAC), and the fifth DLL output (DLL_OUT5)), and outputs the generated address signal (ADDR) and the command signal (CMD) to the memory 20 via the third amplifier 158. Incidentally, the third logic circuit 150 may be incorporated in the fifth DLL 146.

The first amplifier 156 is a circuit that amplifies the strobe signal (DQS) outputted from the first logic circuit 148, and outputs the amplified strobe signal (DQS) to the memory 20. The second amplifier 157 is a circuit that amplifies the data signal (DQ) and the data mask signal (DM) outputted from the second logic circuit 149, and outputs the amplified data signal (DQ) to the memory 20. The third amplifier 138 is a circuit that amplifies the address signal (ADDR) and the command signal (CMD) outputted from the third logic circuit 150, and outputs the amplified address signal (ADDR) and command signal (CMD) to the memory 20. The fourth amplifier 159 is a circuit that amplifies the reference clock signal (PHY_CLK_CK), generates a memory reference signal (CK), which is one type of timing control signal of the memory 20, and outputs the generated memory reference signal (CK) to the memory 20.

Figure 3:
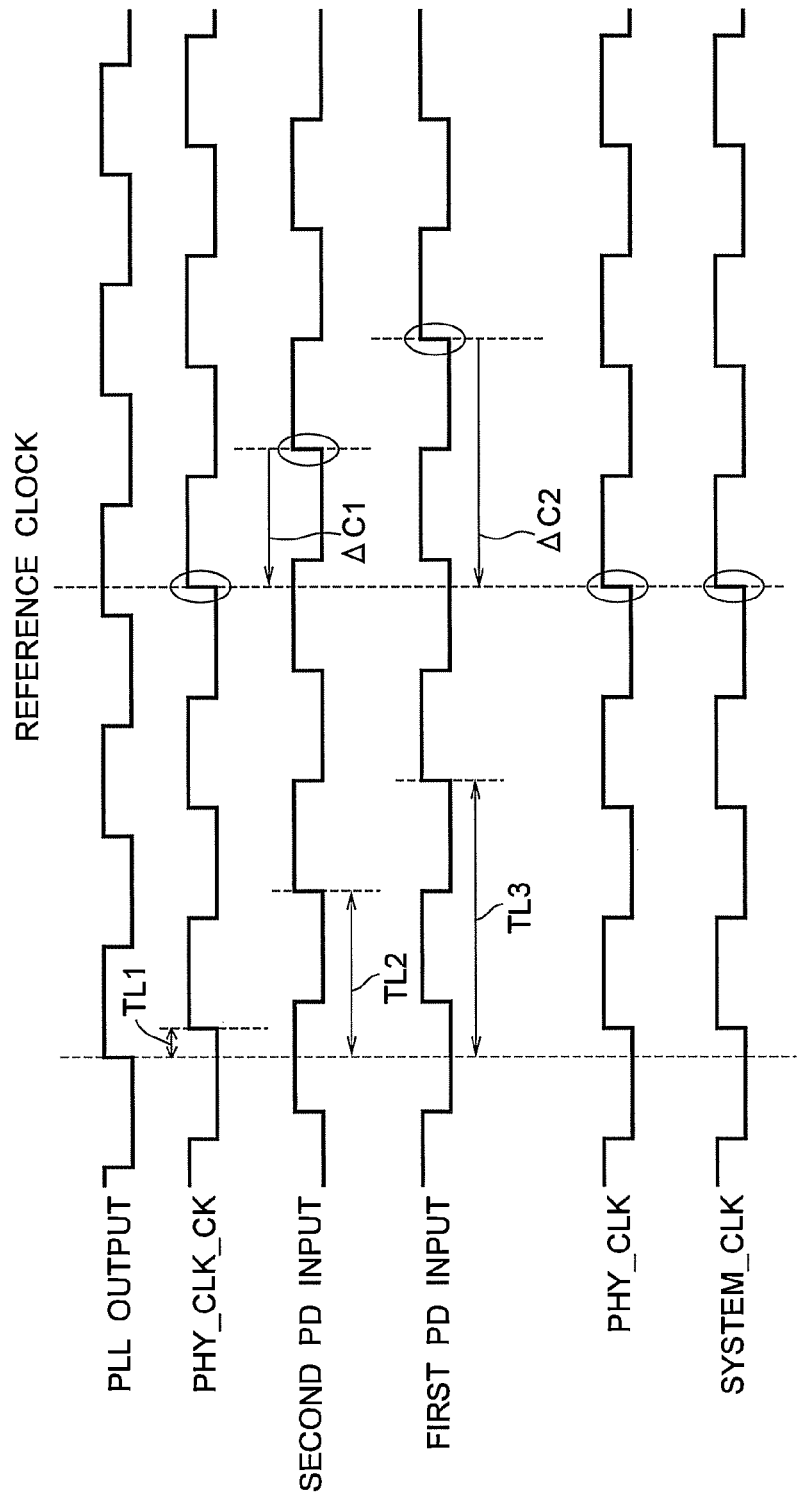
FIG. 3 is a signal waveform chart handled in the memory access apparatus 10 of the present embodiment.

The signals handled in the memory access apparatus of the present embodiment will be described. FIG. 3 is a signal waveform chart handled in the memory access apparatus 10 of the present embodiment.

As shown in FIG. 3, the second PD input, which is the input of the second PD 147b, is delayed by the second clock tree length TL2 with respect to the PLL output at a certain time point. The second PD input is a signal outputted from the third phy-clock tree 153 when the second DLL 143 is not correcting the clock skew. The second clock tree length TL2 is longer than the first clock tree length TL1 and shorter than the third clock tree length TL3. This is because the third phy-clock tree 153 delays the second DLL output (DLL_OUT2) by the second clock tree length TL2 with respect to the PLL output. In this case, the second PD 147b generates the second detection signal (PD_OUT2) indicating that there is a phase difference worth the second clock tree length TL2 between the reference clock signal (PHY_CLK_CK) and the second PD input. The second DLL 143 then calculates the correction amount ΔC1 of the reference clock signal (PHY_CLK_CK) based on the second detection signal (PD_OUT2), and corrects the reference clock signal (PHY_CLK_CK) by the correction amount ΔC1 to generate the second DLL output (DLL_OUT2). The third phy-clock tree 153 then delays the second DLL output (DLL_OUT2) to generate the phy-clock signal (PHY_CLK). The phase of the phy-clock signal (PHY_CLK) thus becomes equal to that of the reference clock signal (PHY_CLK_CK).

The first PD input, which is the input of the first PD 147a, is delayed by the third clock tree length TL3 with respect to the PLL output at a certain time. The first PD input is a signal outputted from the third phy-clock tree 153 when the first DLL 142 is not correcting the clock skew. The third clock tree length TL3 is longer than the second clock tree length TL2. This is because the system clock tree 122 is longer than the third phy-clock tree 153. In this case, the first PD 147a generates the first detection signal (PD_OUT1) indicating that there is a phase difference worth the third clock tree length TL3 between the phy-clock signal (PHY_CLK) and the first PD input. The first DLL 142 then calculates the correction amount ΔC2 of the reference clock signal (PHY_CLK_CK) based on the first detection signal (PD_OUT1), and corrects the reference clock signal (PHY_CLK_CK) by the correction amount ΔC2 to generate the first DLL output (DLL_OUT1). The system clock tree 122 then delays the first DLL output (DLL_OUT1) to generate the system clock signal (SYSTEM_CLK). As described above, the phase of the phy-clock signal (PHY_CLK) is equal to that of the reference clock signal (PHY_CLK_CK), and hence the phase of the system clock signal (SYSTEM_CLK) is also equal to that of the phy-clock signal (PHY_CLK). The correction amount ΔC2 is the difference between the third clock tree length TL3 and the first clock tree length TL1.

Figure 4:
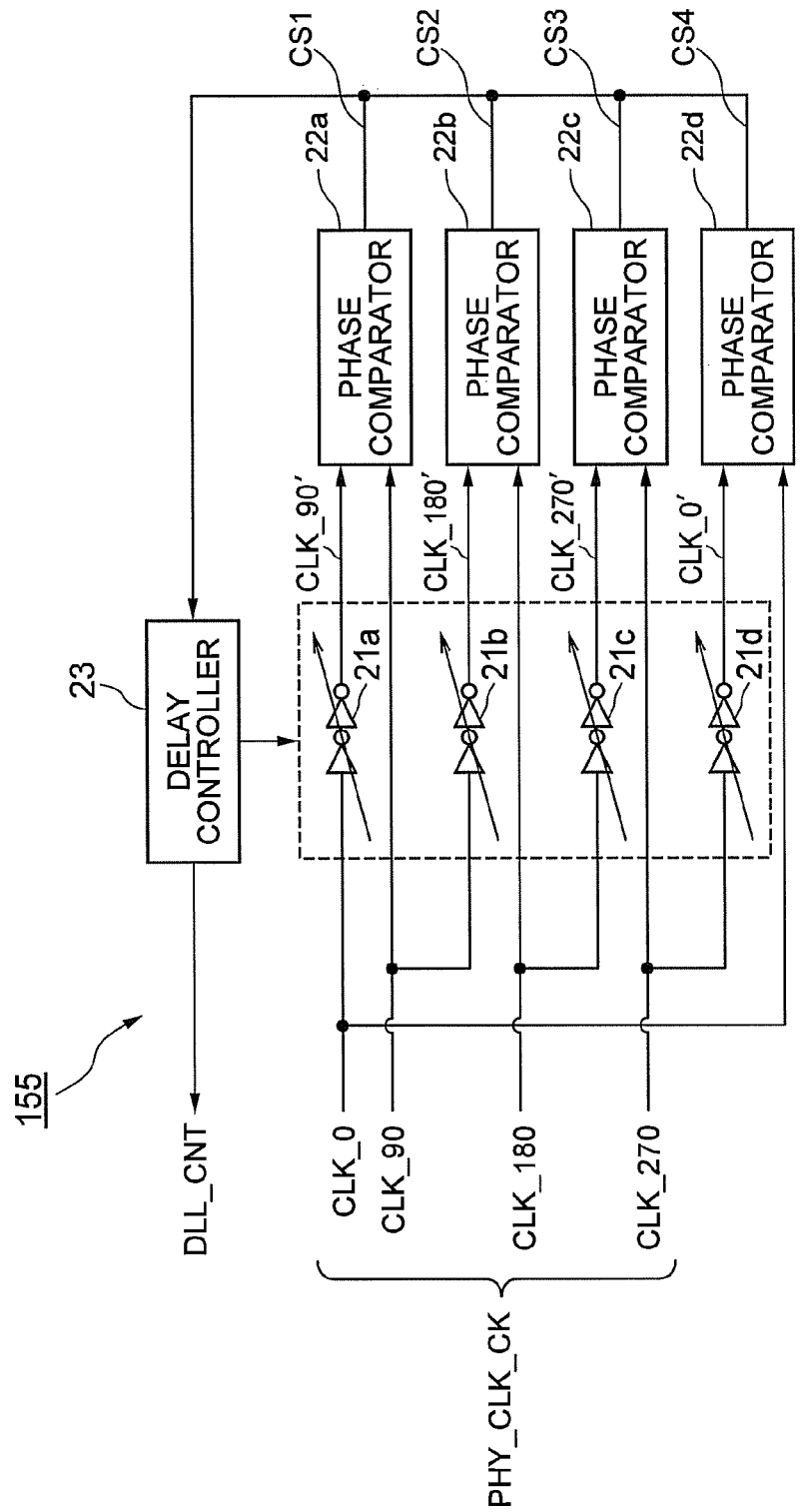
FIG. 4 is a configuration diagram of the master DLL 155 of the present embodiment.

The master DLL of the present embodiment will now be described. FIG. 4 is a configuration diagram of the master DLL 155 of the present embodiment.

FIG. 4 shows the master DLL 155 that uses a four-phase clock. The master DLL 155 includes a plurality of delay elements 21a to 21d, a plurality of phase comparators 22a to 22d, and a delay controller 23.

Each of the delay elements 21a to 21d receives one phase of the reference clock signal of four phases (reference clock signal (CLK_0) of 0 degree, reference clock signal (CLK_90) of 90 degrees, reference clock signal (CLK_180) of 180 degrees, and reference clock signal (CLK_270) of 270 degrees), and delays the received reference clock signal by one phase to generate a delayed reference clock signal. For example, the delay element 21a receives the reference clock signal (CLK_0) of 0 degree, delays the received reference clock signal (CLK_0) of 0 degree by 90 degrees, and generates a delayed reference clock signal (CLK_90') of 90 degrees.

Each of the phase comparators 22a to 22d receives one phase of the reference clock signal of four phases and the delayed reference clock signals (CLK_0' to CLK_270') of four phases, which are outputs of the delay elements 21a to 21d, compares the phase of the reference clock signal (one of CLK_0 to CLK_270) with that of the delayed reference clock signal (one of CLK_0' to CLK_270'), and generates clock skew signals CS1 to CS4 corresponding to the phase difference between the reference clock signal (CLK_0 to CLK_270) and the delayed reference clock signal (CLK_0' to CLK_270').

The delay controller 23 is a circuit that adjusts the number of delay elements 21a to 21d which operate based on one of the clock skew signals CS1 to CS4. For example, the delay controller 23 receives the clock skew signals CS1 to CS4, calculates the number of delay elements (hereinafter referred to as "delay element for 90 degrees") equivalent to the delay value corresponding to 90 degrees (that is, time corresponding to ¼ of clock period) based on one of the received clock skew signals CS1 to CS4, generates a delay correction signal (DLL_CNT) corresponding to the calculated number of delay element for 90 degrees, and outputs the generated delay correction signal (DLL_CNT) to the first DLL 142 to the fifth DLL 146.

First Embodiment

A first embodiment will be described. The first embodiment is an example of first DLL to fifth DLL in the case that the master DLL is used.

Figure 5:
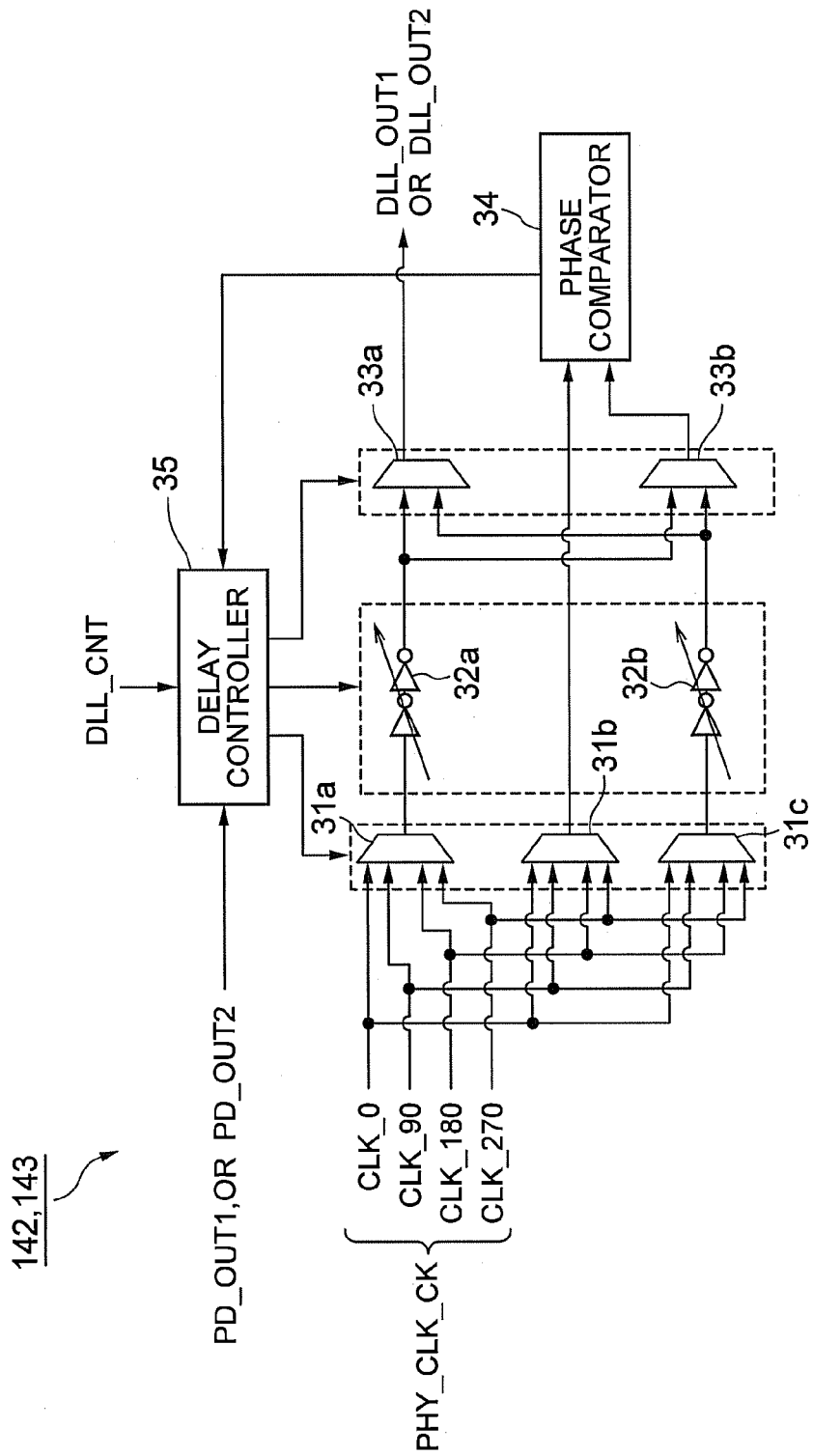
FIG. 5 is a configuration diagram of the first DLL 142 and the second DLL 143 of the first embodiment.
Figure 6:
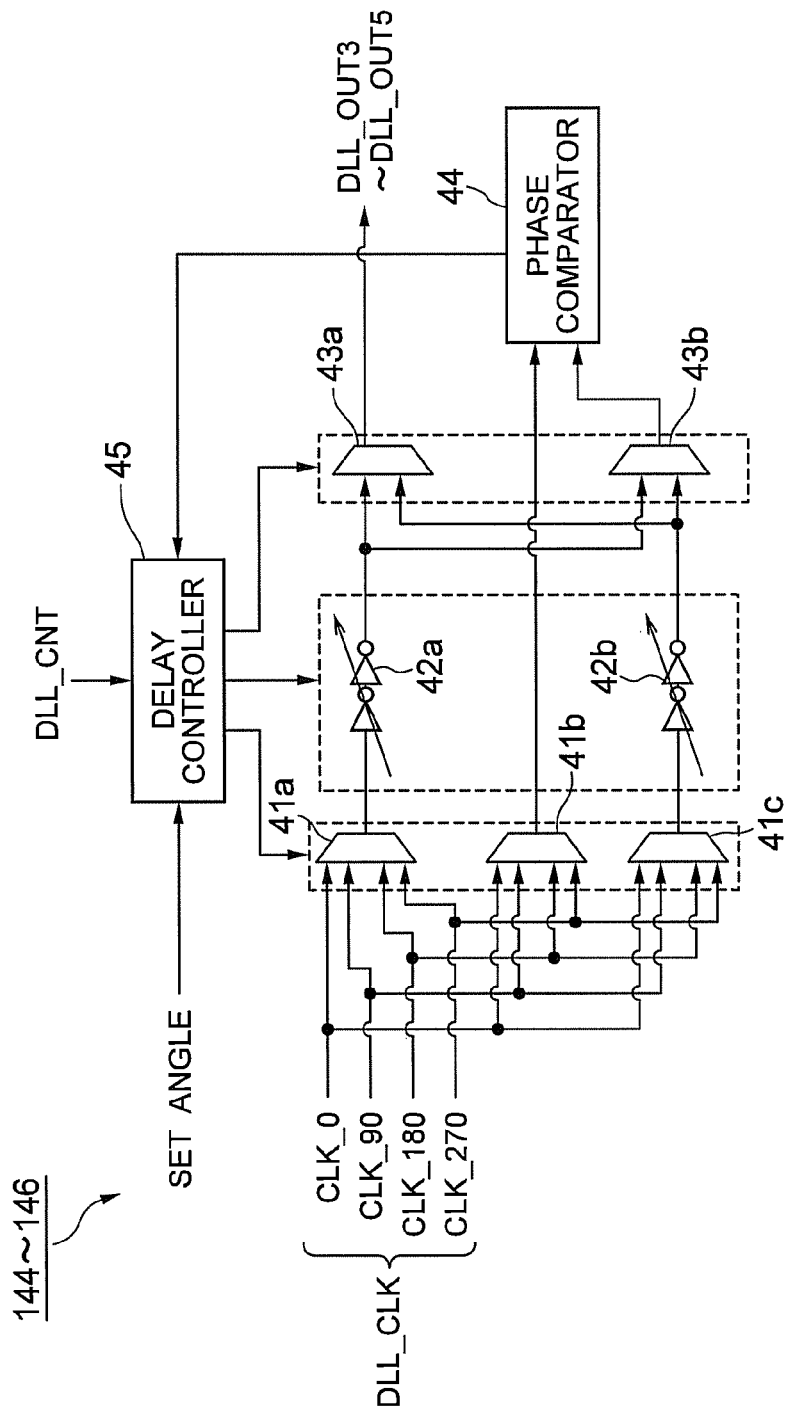
FIG. 6 is a configuration diagram of the third DLL 144 to the fifth DLL 146 of the first embodiment.

The configuration of the first DLL to the fifth DLL of the first embodiment will be described. FIG. 5 is a configuration diagram of the first DLL 142 and the second DLL 143 of the first embodiment. FIG. 6 is a configuration diagram of the third DLL 144 to the fifth DLL 146 of the first embodiment.

FIG. 5 shows the first DLL 142 and the second DLL 143 that use the four-phase clock. Each of the first DLL 142 and the second DLL 143 includes a plurality of first multiplexers 31a to 31c, a plurality of delay element arrays 32a and 32b, a plurality of second multiplexers 33a and 33b, a phase comparator 34, and a delay controller 35.

Each of the first multiplexers 31a to 31c selects one phase of the reference clock signal of four phases (reference clock signal (CLK_0) of 0 degree, reference clock signal CLK_90) of 90 degrees, reference clock signal (CLK_180) of 180 degrees, and reference clock signal (CLK_270) of 270 degrees).

Each of the first multiplexers 31a and 31c is a reference phase multiplexer that selects an arbitrary reference phase in the reference clock signal used in the phase control or calculating the delay correction signal. The two reference phases selected by the first multiplexers 31a and 31c may be the same or different from each other.

The first multiplexer 31b is a selection phase multiplexer that selects an arbitrary selection phase (for example, preceding phase one phase ahead with respect to a reference angle A calculated by the delay controller 35) in the reference clock signal. For example, the first multiplexer 31b selects the clock signal of 180 degrees if the reference angle A is 120 degrees, and selects the clock signal of 270 degrees if the reference angle A is 225 degrees. There are four combinations of the reference phase and the selection phase. In other words, the combination of the reference phase and the selection phase is the reference clock signals (CLK_0 and CLK_90), (CLK_90 and CLK_180), (CLK_180 and CLK_270), and (CLK_270 and CLK_0). Therefore, there are also four delay correction signals (DLL_CNT) to be calculated. As a skew difference produces when the reference clock signals of four phases are inputted, the value of each delay correction signal (DLL_CNT) may vary, but such variation in the value of each delay correction signal (DLL_CNT) can be ignored if the timing margin is sufficiently ensured.

The delay element array 32a delays the reference clock signal of the reference phase selected by the first multiplexer 31a, and generates the delayed reference clock signal of the reference phase. The delay element array 32a is used as a delay element array for controlling the phase or a delay element array for calculating the delay correction signal.

The delay element array 32b delays the reference clock signal of the selection phase selected by the first multiplexer 31c, and generates the delayed reference clock signal of the selection phase. The delay element array 32b is used as a delay element array for calculating the delay correction signal when the delay element array 32a is used as a delay element array for controlling the phase. On the other hand, the delay element array 32b is used as a delay element array for controlling the phase control when the delay element array 32a is used as a delay element array for calculating the delay correction signal. In other words, the functions of the two delay element arrays 32a and 32b are exclusive to each other.

The second multiplexers 33a and 33b are modules that switch the function of the delay element array (for example, delay element array 32a) for controlling the phase, and the function (for example, delay element array 32b) of the delay element array for calculating the delay correction signal.

The second multiplexer 33a is a DLL output multiplexer that selects either one of the reference clock signal (for example, reference clock signal for controlling the phase) outputted from the delay element array 32a, or the reference clock signal (for example, reference clock signal for calculating the delay correction signal) outputted from the delay element array 32b, and outputs the selected reference clock signal to the system clock tree 122 or the third phy-clock tree 153 as the first DLL output (DLL_OUT1) or the second DLL output (DLL_OUT2).

The second multiplexer 33b is a DLL output multiplexer that selects either one of the reference clock signal (for example, reference clock signal for controlling the phase) outputted from the delay element array 32a, or the reference clock signal (for example, reference clock signal for calculating the delay correction signal) outputted from the delay element array 32b.

The phase comparator 34 receives the reference clock signal of the selection phase, and the reference clock signal selected by the second multiplexer 33b, compares the phases of the two reference clock signals with each other, and generates a clock skew signal corresponding to the phase difference between the two reference clock signals.

The delay controller 35 controls the first multiplexers 31a to 31c, the first delay element 32a, the second delay element 32b, and the second multiplexers 33a and 33b based on the first detection signal (PD_OUT1) or the second detection signal (PD_OUT2), the delay correction signal (DLL_CNT), and the clock skew signal. Specifically, the delay controller 35 determines the correction direction based on the first detection signal (PD_OUT1) or the second detection signal (PD_OUT2). Moreover, the delay controller 35 corrects the delay correction signal (DLL_CNT) based on the clock skew signal. The delay controller 35 then updates the correction amount ΔC based on the correction direction corresponding to the first detection signal (PD_OUT1) or the second detection signal (PD_OUT2). Thereby, the correction amount ΔC increases or decreases, and the correction direction of the first detection signal (PD_OUT1) or the second detection signal (PD_OUT2) reverses. The delay controller 35 then calculates the ratio of values of the updated correction amount ΔC and the delay correction signal (DLL_CNT), and determines the reference angle A for adjusting the clock skew based on the calculated ratio. In this case, the delay controller 35 controls the first multiplexer 31a so as to select the reference clock signal (CLK_0) of 0 degree when the reference angle A is between 0 and 90 degrees, controls the first multiplexer 31a so as to select the reference clock signal (CLK_90) of 90 degrees when the reference angle A is between 90 and 180 degrees, controls the first multiplexer 31a so as to select the reference clock signal (CLK_180) of 180 degrees when the reference angle A is between 180 and 270 degrees, and controls the first multiplexer 31a so as to select the reference clock signal (CLK_270) of 270 degrees when the reference angle A is between 270 and 360 degrees.

FIG. 6 shows the third DLL 144 to the fifth DLL 146 that use the four-phase clock. Each of the third DLL 144 to the fifth DLL 146 includes a plurality of first multiplexers 41a to 41c, a plurality of delay element arrays 42a and 42b, a plurality of second multiplexers 43a and 43b, a phase comparator 44, and a delay controller 45. Incidentally, the delay element arrays 42a and 42b as well as the phase comparator 44 are similar to the first DLL 142 and the second DLL 143 (see FIG. 5).

Each of the first multiplexers 41a to 41c selects one phase of the reference clock signal of four phases (reference clock signal (CLK_0) of 0 degree, reference clock signal (CLK_90) of 90 degrees, reference clock signal (CLK_180) of 180 degrees, and reference clock signal (CLK_270) of 270 degrees).

Each of the first multiplexers 41a and 41c is a reference phase multiplexer that selects an arbitrary reference phase in the reference clock signal used for controlling the phase control or calculating the delay correction signal. The two reference phases selected by the first multiplexers 41a and 41c may be the same or different from each other.

The first multiplexer 41b is a selection phase multiplexer that selects a selection phase (for example, preceding phase one phase ahead with respect to a set angle calculated by the delay controller 45) in the reference clock signal. For example, the first multiplexer 41b selects the clock signal of 180 degrees if the set angle is 120 degrees, and selects the clock signal of 270 degrees if the set angle is 225 degrees. There are four combinations of the reference phase and the selection phase.

In other words, the combination of the reference phase and the selection phase is reference clock (CLK_0 and CLK_90), (CLK_90 and CLK_180), (CLK_180 and CLK_270), and (CLK_270 and CLK_0). Therefore, there are also four delay correction signals (DLL_CNT) to be calculated. As a skew difference produces when the reference clock signals of four phases are inputted, the value of each delay correction signal (DLL_CNT) may vary, but such variation in the value of each delay correction signal (DLL_CNT) can be ignored if the timing margin is sufficiently ensured.

The second multiplexers 43a and 43b are modules that switch the function of the delay element array for controlling the phase (for example, delay element array 42a), and the function of the delay element array for calculating the delay correction signal (for example, delay element array 42b).

The second multiplexer 43a is a reference clock selecting part that selects either one of the reference clock signal (for example, reference clock signal for controlling the phase) outputted from the delay element array 42a, or the reference clock signal (for example, reference clock signal for calculating the delay correction signal) outputted from the delay element array 42b, and outputs the selected reference clock signal to the first logic circuit 148 to the third logic circuit 150 as the third DLL output (DLL_OUT3) to the fifth DLL output (DLL_OUT5).

The second multiplexer 43b is a reference clock selecting part that selects either one of the reference clock signal (for example, reference clock signal for controlling the phase) outputted from the delay element array 42a, or the reference clock signal (for example, reference clock signal for calculating the delay correction signal) outputted from the delay element array 42b.

Figure 7:
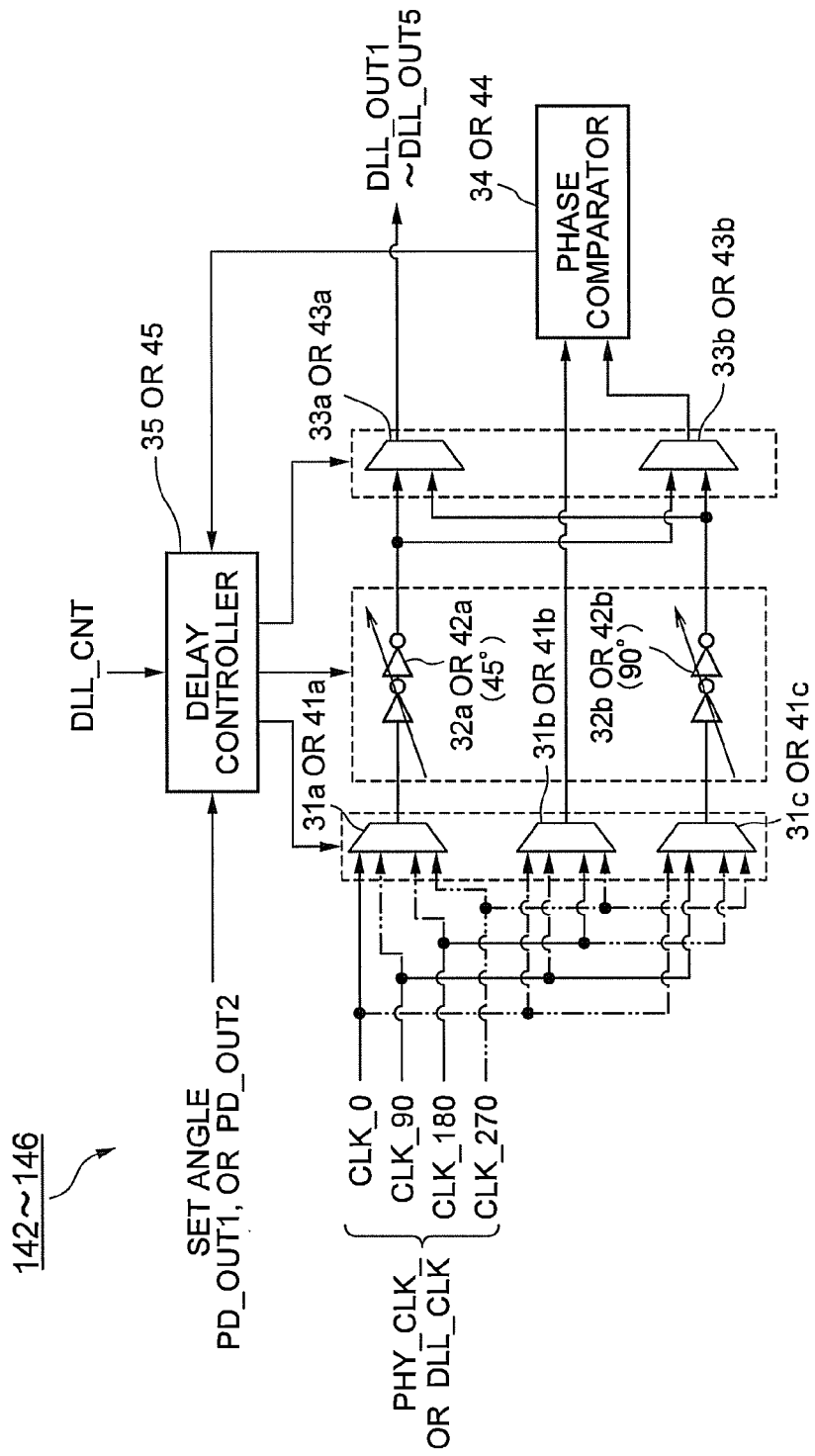
FIG. 7 is an explanatory view of the operation of the first DLL 142 to the fifth DLL 146 of the first embodiment.

The delay controller 45 controls the first multiplexers 41a to 41c, the first delay element 42a, the second delay element 42b, and the second multiplexers 43a and 43b based on the set angle and the clock skew signal. Specifically, the delay controller 45 controls the first multiplexer 41a so as to select the reference clock signal (CLK_0) of 0 degree when the set angle is between 0 and 90 degrees, controls the first multiplexer 41a so as to select the reference clock signal (CLK_90) of 90 degrees when the set angle is between 90 and 180 degrees, controls the first multiplexer 41a so as to select the reference clock signal (CLK_180) of 180 degrees when the set angle is between 180 and 270 degrees, and controls the first multiplexer 41a so as to select the reference clock signal (CLK_270) of 270 degrees when the set angle is between 270 and 360 degrees The operation of the first DLL to the fifth DLL of the first embodiment will now be described. FIG. 7 is an explanatory view of the operation of the first DLL 142 to the fifth DLL 146 of the first embodiment. Incidentally, the third DLL 144 to the fifth DLL 146 of FIG. 6 operate similar to the first DLL 152 and the second DLL 143 of FIG. 5, and thus the description thereof will be omitted.

For example, as shown in FIG. 7, the delay controller 35 controls the first multiplexers 31a and 31c so as to select the reference clock signal (CLK_0) of 0 degree, and controls the first multiplexer 31b so as to select the reference clock signal (CLK_90) of 90 degrees when the reference angle A is 45 degrees. Moreover, the delay controller 45 of FIG. 6 operates similar to the delay controller 35 of FIG. 5 when the set angle is 45 degrees.

The delay controller 35 of FIG. 5 adjusts the number of delay elements for 90 degrees of the delay element array (for example, delay element array 32b) for calculating the delay correction signal based on the reference angle A and the delay correction signal (DLL_CNT). For example, the delay controller 35 calculates the number of delay elements by using equation 1. In equation 1, N is the number of delay elements, C is the value of the delay correction signal (DLL_CNT), MOD(R/90) is a remainder of when R is divided by 90, and R is the reference angle A. The delay controller 35 holds the calculation result of equation 1 as the delay correction signal (DLL_CNT) indicating a delay adjustment amount optimized with respect to the first DLL 142 to the fifth DLL 146. Moreover, the delay controller 45 of FIG. 6 operates similar to the delay controller 35 of FIG. 5.

$$N = C * \frac{\mathrm{MOD}\left(\frac{R}{90}\right)}{90} \quad \text{[Equation 1]}$$

An operation example of the delay controller 35 will be described.

First, the delay controller 35 controls the first multiplexer 31c so as to select the reference clock signal of an arbitrary phase (for example, reference clock signal (CLK_0) of 0 degree). The delay controller 35 then adjusts the number of delay elements of the delay element array (for example, delay element array 32b) for calculating the delay correction signal in a predetermined quadrant (for example, quadrant from 0 degree to 90 degrees). The delay controller 35 then controls the first multiplexer 31c so as to select the reference clock signal of a phase of a quadrant (hereinafter referred to as "non-adjusted quadrant") in which the number of delay elements is not adjusted. The delay controller 35 adjusts the number of delay elements in the non-adjusted quadrant with a value of the calculated delay correction signal as a starting point. Thereby, the initial adjustment of the first DLL 142 to the fifth DLL 146 is finished. In the initial adjustment, a required time for calculating the delay correction signal can be shortened since the calculated delay correction signal (that is, calculation result of the quadrant in which the number of delay elements is adjusted) is used when adjusting the number of delay elements in the non-adjusted quadrant.

After the initial adjustment of the first DLL 142 to the fifth DLL 146 is finished, the delay controller 35 constant monitors the phase comparator 34 while the first DLL 142 to the fifth DLL 146 are operating. For example, if the delay element array 32b is used as the delay element array for calculating the delay correction signal, the delay controller 35 makes the second multiplexer 33b select the delay element array 32b, makes the first multiplexer 31b select a clock (for example, 180 degrees) one phase ahead with respect to the clock (for example, 120 degrees) being used, and makes the first multiplexer 31c select the clock (for example, 90 degrees) one phase before with respect to the clock being used. The delay element array 32b delays the delay correction signal (DLL_CNT) by about 90 degrees. In this case, the delay controller 35 reduces the value of the delay correction signal if the clock skew signal indicates that the clock skew path in which the clock skew signal passes the delay element is longer, and increases the value of the delay correction signal if the clock skew signal indicates that the clock skew path is shorter. For example, when correcting the properties of the delay element in accordance with voltage and temperature, the value of the delay correction signal (DLL_CNT) always needs to be updated by using the delay element array for calculating the delay correction signal. The delay correction signal (DLL_CNT) in other than the quadrant used as a delay line also needs to be updated.

In parallel with such initial adjustment, each of the first DLL 142 and the second DLL 143 continues to reference the first detection signal (PD_OUT1) and the second detection signal (PD_OUT2) even after the initial adjustment to change the correction amount ΔC in accordance with the change in skew.

The memory access circuit 14 of the first embodiment includes the first DLL 142 to the fifth DLL 146 that correct the skew between the clocks with the clock tree optimally wired in accordance with the timing margin of the memory access circuit 14, as described above. Therefore, the increase in the circuit scale and the power consumption of the memory access circuit 14 can be suppressed, and the clock skew of the memory access circuit 14 can be corrected without reducing the timing margin.

Second Embodiment

A second embodiment will now be described. The second embodiment is an example of first DLL to fifth DLL having a smaller circuit area and a smaller power consumption than the first embodiment. The description similar to the embodiment described above will be omitted.

Figure 8:
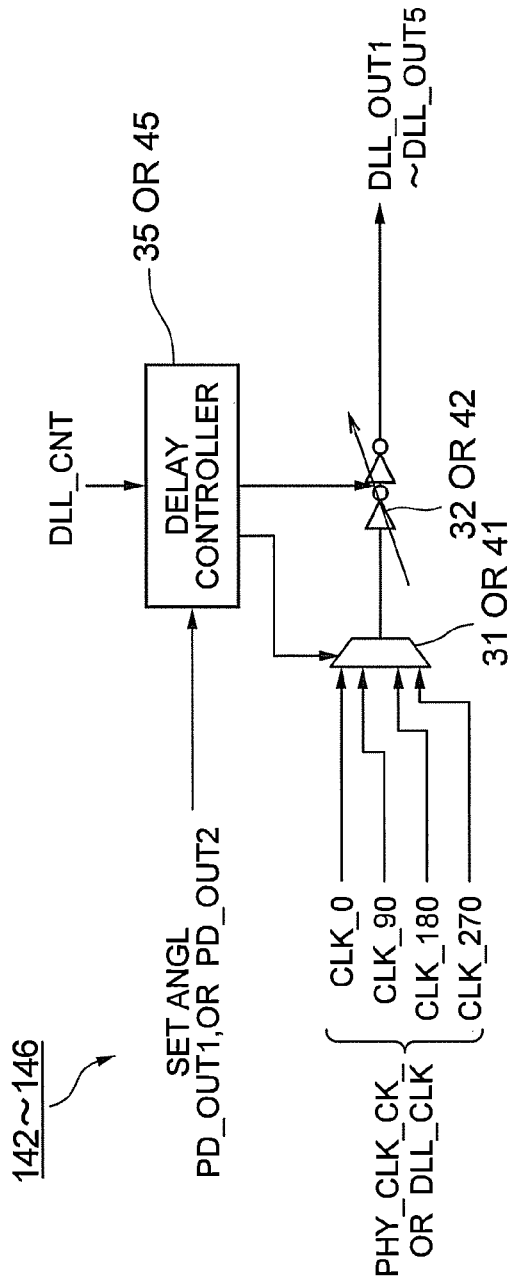
FIG. 8 is a configuration diagram of the first DLL 142 to the fifth DLL 146 of the second embodiment.

The configuration of the first DLL to the fifth DLL of the second embodiment will be described. FIG. 8 is a configuration diagram of the first DLL 142 to the fifth DLL 146 of the second embodiment.

FIG. 8 shows each DLL that uses a four-phase clock. Each of the first DLL 142 to the fifth DLL 146 includes a first multiplexer 31 or 41, a delay element array 32 or 42, and a delay controller 35 or 45.

Each of the first multiplexers 31 and 41 is a reference phase multiplexer that selects one phase of a reference clock signal of four phases (reference clock signal (CLK_0) of 0 degree, reference clock signal (CLK_90) of 0 degrees, reference clock signal (CLK_180) of 180 degrees, and reference clock signal (CLK_270) of 270 degrees).

The delay elements 32 and 42 respectively delays the reference clock signal outputted from the first multiplexers 31 and 41, generates a delayed reference clock signal, and outputs the generated delayed reference clock signal to the system clock tree 122 as well as the first logic circuit 148 and the second logic circuit 149 as the first DLL output (DLL_OUT1) to the fifth DLL output (DLL_OUT5).

The delay controllers 35 and 45 respectively controls the first multiplexers 31 and 41 based on the first PD output (PD_OUT1) and the second PD output (PD_OUT2), or the set angle. Specifically, the delay controllers 35 and 45 controls the first multiplexers 31 and 41 so as to select the reference clock signal (CLK_0) of 0 degree when the reference angle A and the set angle are between 0 and 90 degrees, controls the first multiplexers 31 and 41 so as to select the reference clock signal (CLK_90) of 90 degrees when the reference angle A and the set angle are between 90 and 180 degrees, controls the first multiplexers 31 and 41 so as to select the reference clock signal (CLK_180) of 180 degrees when the reference angle A and the set angle are between 180 and 270 degrees, controls the first multiplexers 31 and 41 so as to select the reference clock signal (CLK_270) of 270 degrees when the reference angle A and the set angle are between 270 and 360 degrees, respectively.

Each of the delay controllers 45 of the third DLL 144 to the fifth DLL 146 adjusts the number of delay elements for 90 degrees of the delay element array 42 based on the set angle and the delay correction signal (DLL_CNT). For example, the delay controller 45 calculates the number of delay elements by using equation 1. The delay controller 45 holds the calculation result of equation 1 as the delay correction signal (DLL_CNT) corresponding to the delay adjustment amount optimized with respect to the third DLL 144 to the fifth DLL 146.

The first DLL 142 and the second DLL 143 of the second embodiment do not include the second multiplexers 33a and 33b, as well as the phase comparator 34 of the first embodiment. The third DLL 144 to the fifth DLL 146 of the second embodiment do not include the second multiplexers 43a and 43b, as well as the phase comparator 44 of the first embodiment. Furthermore, the first multiplexers 31 and 41, as well as the delay element arrays 32 and 42 of the second embodiment are less than those of the first embodiment. Therefore, the circuit area and the power consumption of the first DLL 142 to the fifth DLL 146 can be reduced compared to the first embodiment when correcting the clock skew of a path in which the demand on the timing margin is relatively lenient.

Third Embodiment

A third embodiment will now be described. The third embodiment is an example in which the delay controller calculates the correction amount of the n-phase clock. The description similar to the embodiments described above will be omitted.

The configuration of the first DLL to the fifth DLL of the third embodiment is similar to that of the first embodiment (FIGS. 5 and 6).

Figure 9:
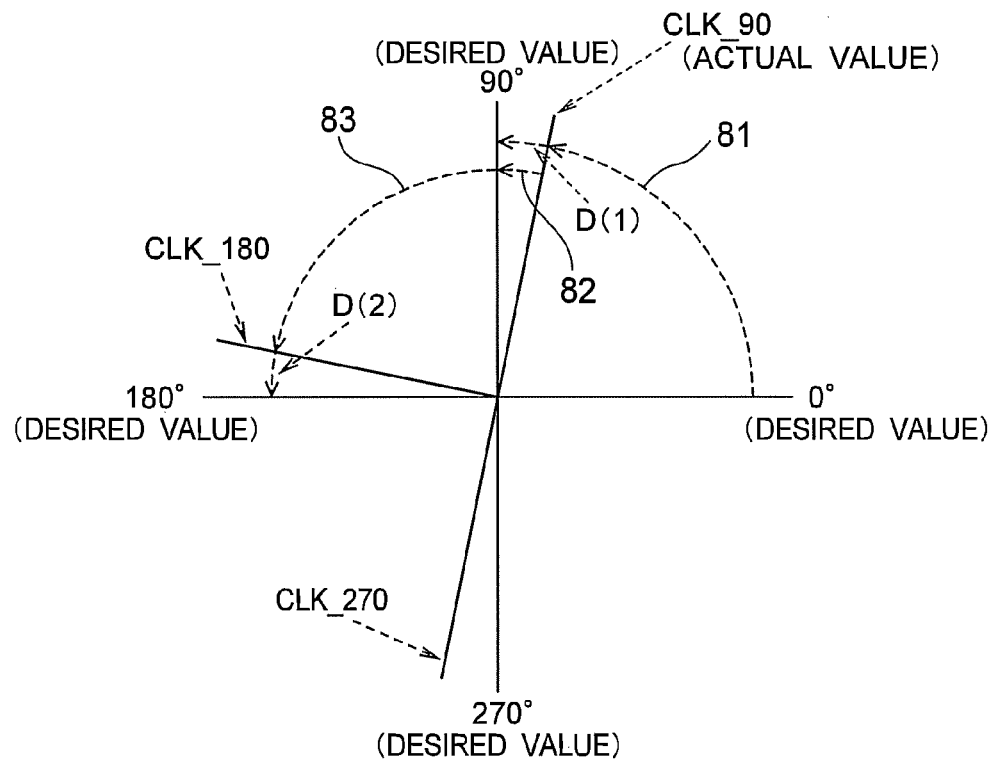
FIG. 9 shows the delay correction signal (DLL_CNT) of when the actual reference clock signal (CLK_90, CLK_180, and CLK_270) is shorter than the reference clock signal (CLK_0) in the four-phase clock.
Figure 10:
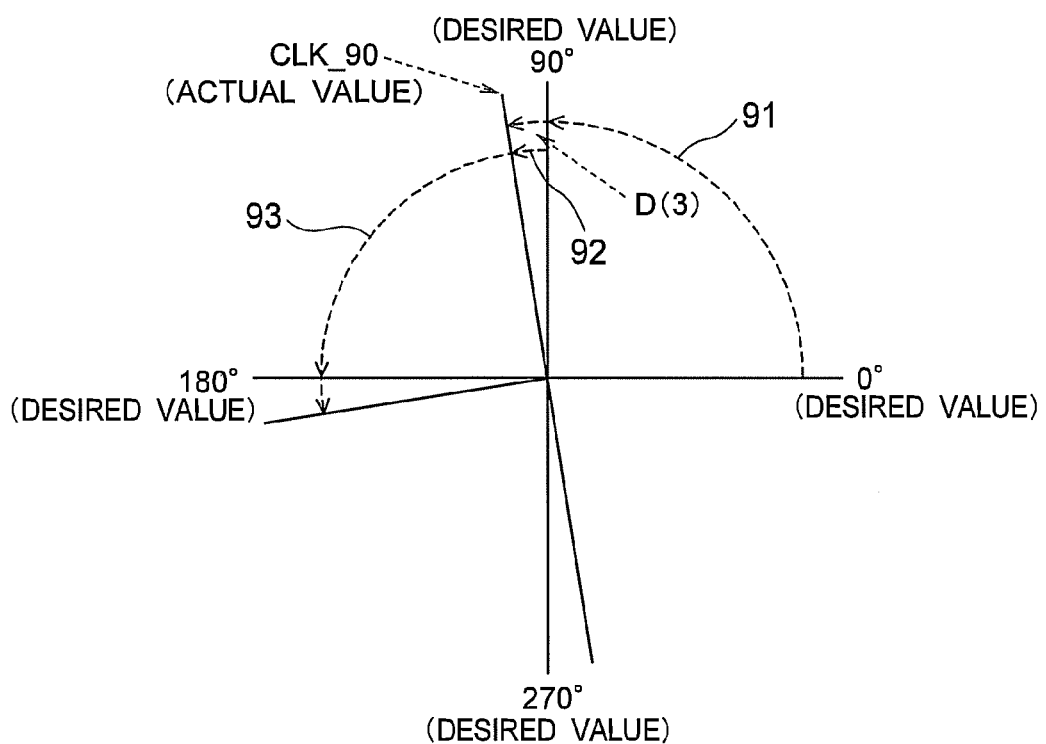
FIG. 10 shows the delay correction signal (DLL_CNT) of when the actual reference clock signals (CLK_90, CLK_180, and CLK_270) are longer than the reference clock signal (CLK_0) in the four-phase clock.

The operation of the first DLL to the fifth DLL of the third embodiment will now be described. FIGS. 9 and 10 are operation explanatory views of the first DLL 142 to the fifth DLL 146 of the third embodiment.

An ideal value of the delay correction signal (DLL_CNT) per one phase is obtained by dividing the total (that is. 360 degrees) of the delay correction signal by the number N of delay elements. For example, the calculation formula of the correction amount of the delay correction signal (DLL_CNT) of the m (m is a natural number) phase changes in accordance with the magnitude relationship between the total of the delay correction signal (DLL_CNT) to the $(m-1)^{st}$ phase and the total of the ideal value to the $(m-1)^{st}$ phase, and the magnitude relationship between the total of the delay correction signal (DLL_CNT) to the $m^{th}$ phase and the total of the ideal value to the $m^{th}$ phase. For example, in order to set the 360×(m−1)/N degree, the 0 degree correction value of the $m^{th}$ phase is required.

FIG. 9 shows the delay correction signal (DLL_CNT) of when the actual reference clock signal (CLK_90, CLK_180, and CLK_270) is shorter than the reference clock signal (CLK_0) in the four-phase clock.

In the first phase (greater than or equal to 0 degree), the delay correction signal (DLL_CNT) 81 is smaller than 90 degrees (ideal value). Therefore, the delay controllers 35 and 45 calculate the difference D(1) of the reference clock signal (CLK_90) and the 90 degrees (ideal value) by using equation 2.

In equation 2, SUM is the total of the delay correction signal (DLL_CNT), and DLL_CNT(1) is the delay correction signal (DLL_CNT) 81 of the first phase. The corrected delay correction signal (DLL_CNT) corresponds to the sum of the delay correction signal (DLL_CNT) 81 of the first phase (greater than or equal to 0 degree) and the difference D(1).

$$D(1) = \frac{SUM}{4} - DLL\_CNT(1) \quad \text{[Equation 2]}$$

In the second phase (greater than or equal to 90 degrees), the reference clock signal (CLK_90) is smaller than 90 degrees (ideal value). Therefore, each of the delay controllers 35 and 45 calculates a value obtained by adding the phase D(1) to the phase of the reference clock signal (CLK_90) (0 degree correction value).

In the second phase (greater than or equal to 90 degrees), the delay correction signal (DLL_CNT) 83 is smaller than 180 degrees (ideal value). Therefore, each of the delay controllers 35 and 45 calculates the difference D(2) between the reference clock signal (CLK_180) and the 180 degrees (ideal value) by using equation 3. In equation 3, SUM is the total of the delay correction signal (DLL_CNT), and SUM(2) is the total of the delay correction signal (DLL_CNT) up to the second phase. The corrected delay correction signal (DLL_CNT) corresponds to the sum of the delay correction signal (DLL_CNT) 83 of the second phase (greater than or equal to 90 degrees) and the difference D(2).

$$D(2) = \frac{2 \times \text{SUM}}{4} - \text{SUM}(2) \qquad \text{[Equation 3]}$$

FIG. 10 shows the delay correction signal (DLL_CNT) of when the actual reference clock signals (CLK_90, CLK_180, and CLK_270) are longer than the reference clock signal (CLK_0) in the four-phase clock.

In the first phase (greater than or equal to 0 degree), the delay correction signal (DLL_CNT) 91 is greater than 90 degrees (ideal value). Therefore, each of the delay controllers 35 and 45 calculates the difference D(3) between the reference clock signal (CLK_90) and the 90 degrees (ideal value) by using equation 4. In equation 4, SUM is the total of the delay correction signal (DLL_CNT), and DLL_CNT(1) is the delay correction signal (DLL_CNT) 91 of the first phase. The corrected delay correction signal (DLL_CNT) corresponds to the sum of the delay correction signal (DLL_CNT) 91 of the first phase (greater than or equal to 0 degree) and the difference D(3).

$$D(3) = \text{DLL\_CNT}(1) - \frac{\text{SUM}}{4} \qquad \text{[Equation 4]}$$

In order to set an angle of a zone 92, the delay controllers 35 and 45 set the delay correction signal (DLL_CNT) 91, which is a delay for 90 degrees, as a 90 degree correction value with the reference clock signal (CLK_0) as the starting point. The zone 92 represents a difference between the actual value and the ideal value of the reference clock signal (CLK_90). In other words, the zone 92 represents the range of phase to set the set angle with the reference clock signal (CLK_0) as the starting point. The delay controllers 35 and 45 then sets the "(value obtained by subtracting 90 degrees from set angle)+(90 degree correction value)" in the delay element array 32a and 42a, and 32b and 42b, respectively.

In order to set an angle of a zone 93, the delay controllers 35 and 45 set a value obtained by subtracting the difference D(3) from the set angle (that is, delay correction signal (DLL_CNT) 91) in the delay element array 32a and 42a, and 32b and 42b with the reference clock signal (CLK_90) as the starting point, respectively.

In the third embodiment, each of the delay controller 35 and 45 calculate the correction amount of the n phase clock. Therefore, the accuracy of correction can be improved when the reduction in the timing margin due to the skew difference of the n phase clock is a problem.

Fourth Embodiment

A fourth embodiment will be described. An example of providing the system cock signal (SYSTEM_CLK) to the PLL 141 is described. The description similar to the embodiments described above will be omitted.

Figure 11:
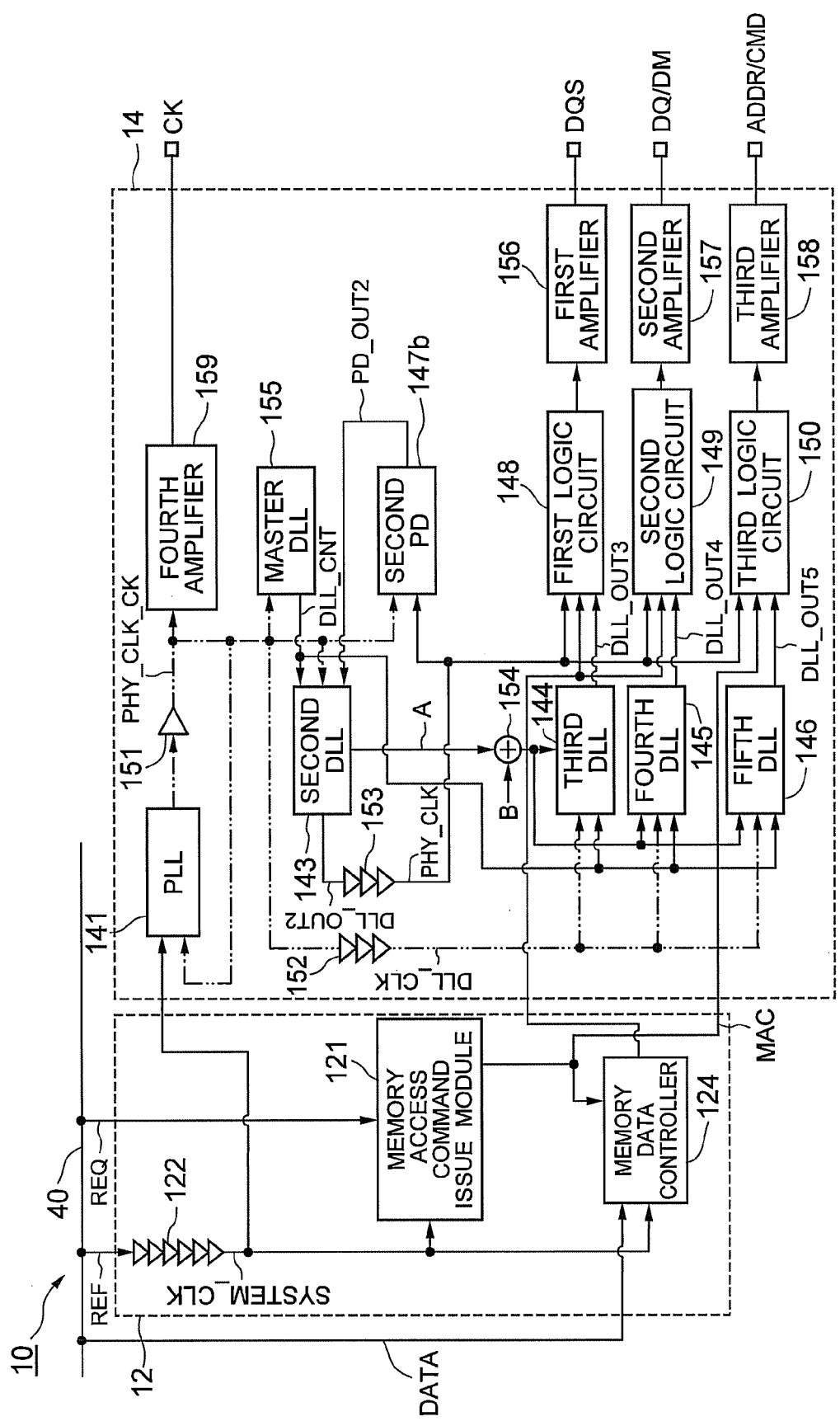
FIG. 11 is a configuration diagram of a memory access apparatus 10 of the fourth embodiment.

A configuration of a memory access apparatus of the fourth embodiment will be described. FIG. 11 is a configuration diagram of a memory access apparatus 10 of the fourth embodiment.

As shown in FIG. 11, the memory access apparatus 10 includes a system circuit 12 and a memory access circuit 14, similar to the first embodiment to the third embodiment. The memory access circuit 14 is connected to a memory 20 and a system circuit 12.

The system circuit 12 is a circuit that issues a memory access command (MAC). The system circuit 12 includes a memory access command issue module 121, a system clock tree 122, and a memory data controller 124.

The memory access circuit 14 is a circuit that controls memory access. The memory access circuit 14 includes a PLL 141, a second DLL 143 to a fifth DLL 146, a second PD 147b, a first logic circuit 148 to a third logic circuit 150, a first phy-clock tree 151 to a third phy-clock tree 153, a set angle calculating module 154, a master DLL 155, and a first amplifier 156 to a fourth amplifier 159. The number of DLLs is not limited to five. In other words, the memory access circuit 14 may include five or more DLLs. The number of memory access command issue modules 121 and the first logic circuit 148 to the third logic circuit 150 is arbitrary.

The memory access command issue module 121 is a module that issues the memory access command (MAC) commanding an access to the memory 20. For example, the memory access command issue module 121 receives the request (REQ) transferred via a bus 40 and the system clock signal (SYSTEM_CLK) generated by the system clock tree 122, and issues the memory access command (MAC) based on the received request (REQ) and system clock signal (SYSTEM_CLK).

The system clock tree 122 is a module that delays the reference signal (REF) by a predetermined third clock tree length TL3 to generate the system clock signal (SYSTEM_CLK).

The memory data controller 124 outputs the data (DATA) inputted from the bus to the first logic circuit 148 and the second logic circuit 149 in accordance with the memory access command (MAC) issued by the memory access command issue module 121.

The PLL 141 is a circuit that detects a phase difference between the reference frequency and the PLL output, and generates the PLL output which is locked to the reference frequency based on the detected phase difference. The PLL output is a source signal of the reference clock signal (PHY_CLK_CK). In other words, the system clock signal (SYSTEM_CLK) and the reference clock signal (PLL_CLK_CK) is deskewed by the PLL 141.

The first phy-clock tree 151 is a module that delays the PLL output by a predetermined first clock tree length TLα to generate the reference clock signal (PHY_CLK_CK). The reference clock signal (PHY_CLK_CK) has a frequency obtained by gradually multiplying the reference frequency. The reference clock signal (PHY_CLK_CK) is a source signal (that is, source clock of memory 20) of the timing control signal for controlling the operation timing of the memory 20, and thus the reference clock signal (PHY_CLK_CK) is a signal of highest priority to reduce the clock jitter among the signals used in the memory access circuit 14 and is transmitted with a wiring having the shortest wiring length.

The master DLL 155 is a circuit that generates a delay correction signal (DLL_CNT) used for determination of the correction amount ΔC of the clock skew. For example, the master DLL 155 receives the reference clock signal (PHY_CLK_CK), counts the clock of the received reference clock signal (PHY_CLK_CK), and generates the delay correction signal (DLL_CNT). The delay correction signal (DLL_CNT) is a signal indicating the number of delay elements corresponding to a period of one cycle of the reference clock signal. In other word, the delay correction signal (DLL_CNT) becomes a reference of the correction amount ΔC.

The second phy-clock tree 152 is a module that receives the reference clock signal (PHY_CLK_CK), and delays the reference clock signal (PHY_CLK_CK) by a predetermined second clock tree length TL2 with respect to the PLL output to generate the DLL clock signal (DLL_CLK). The DLL clock signal (DLL_CLK) is a source signal of the strobe signal (DQS) and the data signal (DQ). The strobe signal (DQS) is one of timing control signal.

The second DLL 143 is a clock deskew circuit that corrects the clock skew between the reference clock signal (PHY_CLK_CK) and the phy-clock signal (PHY_CLK). The phy-clock signal (PHY_CLK) is a signal used in the memory access circuit 14. For example, the second DLL 143 receives the reference clock signal (PHY_CLK_CK), the second PD output (PD_OUT2), which is the output of the second PD147b, and the delay correction signal (DLL_CNT), determines the correction direction based on the second PD output (PD_OUT2), determines the correction amount ΔC1 based on the delay correction signal (DLL_CNT), delays the reference clock signal (PHY_CLK_CK) based on the determined correction direction and correction amount ΔC1, and generates the second DLL output (DLL_OUT2). The second DLL output (DLL_OUT2) is a source signal of a phy-clock signal (PHY_CLK). The second DLL 143 also generates a reference angle A corresponding to the correction amount ΔC1.

The third phy-clock tree 153 is a module that receives the second DLL output (DLL_OUT2), and delays the second DLL output (DLL_OUT2) by a predetermined second clock tree length TL2 with respect to the PLL output to generate the phy-clock signal (PHY_CLK). In other words, the phy-clock signal (PHY_CLK) is a signal generated on the basis of the second DLL output (DLL_OUT2) in which the clock skew is corrected. The clock tree length of the phy-clock signal (PHY_CLK) is equal to that of the DLL clock signal (DLL_CLK).

The set angle calculating module 154 is a module that calculates the set angle to be provided to the third DLL 144 to the fifth DLL 146. The set angle is information indicating the phase difference to be set among the strobe signal (DQS), which is the output of the first logic circuit 148, the data signal (DQ) and the data mask signal (DM), which are the outputs of the second logic circuit 149, and the address signal (ADDR) and the command signal (CMD), which are the outputs of the third logic circuit 150. For example, the set angle calculating module 154 adds the reference angle A generated by the second DLL 143 and a predetermined phase angle B generated by a predetermined external circuit (for example, system circuit 12) connected to the memory access circuit 14, and outputs the sum of the reference angle A and the phase angle B to the third DLL 144 to the fifth DLL 146 as the set angle. The phase angle B is an angle indicating an arbitrary additional correction amount individually determined by the system circuit 12 for each of the third DLL 144 to the fifth DLL 146, and the phase angle B is an angle corresponding to the phase difference to be set among the strobe signal (DQS), the data signal (DQ) and the data mask signal (DM), and the address signal (ADDR) and the command signal (CMD). In other words, the system circuit 12 individually determines the phase angles for the third DLL 144, the fourth DLL 145, and the fifth DLL 146. The phase angle B may include the phase difference to be set between the strobe signal (DQS) and the memory reference signal (CK) in addition to the phase difference to be set among the strobe signal (DQS), the data signal (DQ), and the address signal (ADDR) and the command signal (CMD).

Each of the third DLL 144 to the fifth DLL 146 is a clock deskew circuit that corrects the clock skew between the reference clock signal (PHY_CLK_CK) and the DLL clock signal (DLL_CLK). For example, the third DLL 144 to the fifth DLL 146 receives the set angle, the DLL clock signal (DLL_CLK), and the delay correction signal (DLL_CNT), determines the correction direction and the correction amount based on the set angle and the delay correction signal (DLL_CNT), delays the reference clock signal (PHY_CLK_CK) based on the determined correction direction and correction amount, and generates the third DLL output (DLL_OUT3) to the fifth DLL output (DLL_OUT5), respectively. The third DLL output (DLL_OUT3) is a source signal of the strobe signal (DQS). The fourth DLL output (DLL_OUT4) is a source signal of the data signal (DQ) and the data mask signal (DM). The fifth DLL output (DLL_OUT5) is a source signal of the address signal (ADDR) and the command signal (CMD).

The second PD 147b is a circuit (for example, flip-flop) that detects the shift between the phase at the clock edge of the phy-clock signal (PHY_CLK) and the phase at the clock edge of the reference clock signal (PHY_CLK_CK). For example, the second PD 147b receives the phy-clock signal (PHY_CLK) and the reference clock signal (PHY_CLK_CK), detects the shift between the clock edge of the phy-clock signal (PHY_CLK) and the clock edge of the reference clock signal (PHY_CLK_CK), and generates a second detection signal (PD_OUT2) indicating the delaying direction of the phy-clock signal (PHY_CLK) with respect to the system clock signal (SYSTEM_CLK) (whether the phy-clock signal (PHY_CLK) is delayed or advanced with respect to the system clock signal (SYSTEM_CLK)). The second detection signal (PD_OUT2) is a signal of one bit corresponding to the phase difference between the phy-clock signal (PHY_CLK) and the reference clock signal (PHY_CLK_CK). In this case, "0" means that the phy-clock signal (PHY_CLK) is delayed with respect to the reference clock signal (PHY_CLK_CK), and "1" means that the phy-clock signal (PHY_CLK) is advanced with respect to the reference clock signal (PHY_CLK_CK).

The first logic circuit 148 is a circuit that generates the strobe signal (DQS) of the memory 20. For example, the first logic circuit 148 receives the phy-clock signal (PHY_CLK), the data (DATA), and the third DLL output (DLL_OUT3), generates the strobe signal (DQS) from the received signals, and outputs the generated strobe signal (DQS) to the memory 20. The first logic circuit 148 may be incorporated in the third DLL 144.

The second logic circuit 149 is a circuit that generates the data signal (DQ) and the data mask signal (DM) of the memory 20. For example, the second logic circuit 149 receives the phy-clock signal (PHY_CLK), the data signal (DATA), and the fourth DLL output (DLL_OUT4), generates the data signal (DQ) from the received signals, and outputs the generated data signal (DQ) to the memory 20. The second logic circuit 149 may be incorporated in the fourth DLL 145.

The third logic circuit 150 is a circuit that generates the address signal (ADDR) and the command signal (CMD) of the memory 20. For example, the third logic circuit 150 receives the phy-clock signal (PHY_CLK), the memory access command (MAC), and the fifth DLL output (DLL_OUT5), generates the address signal (ADDR) and the command signal (CMD) from the received signals, and outputs the generated address signal (ADDR) and the command signal (CMD) to the memory 20 via the third amplifier 158. The third logic circuit 150 may be incorporated in the fifth DLL 146.

The first amplifier 156 is a circuit that amplifies the strobe signal (DQS) outputted from the first logic circuit 148, and outputs the amplified strobe signal (DQS) to the memory 20. The second amplifier 157 is a circuit that amplifies the data signal (DQ) and the data mask signal (DM) outputted from the second logic circuit 149, and outputs the amplified data signal (DQ) to the memory 20. The third amplifier 138 is a circuit that amplifies the address signal (ADDR) and the command signal (CMD) outputted from the third logic circuit 150, and outputs the amplified address signal (ADDR) and command signal (CMD) to the memory 20. The fourth amplifier 159 is a circuit for amplifying the reference clock signal (PHY_CLK_CK), generating a memory reference signal (CK), which is one type of timing control signal of the memory 20, and outputting the generated memory reference signal (CK) to the memory 20.

Figure 12:
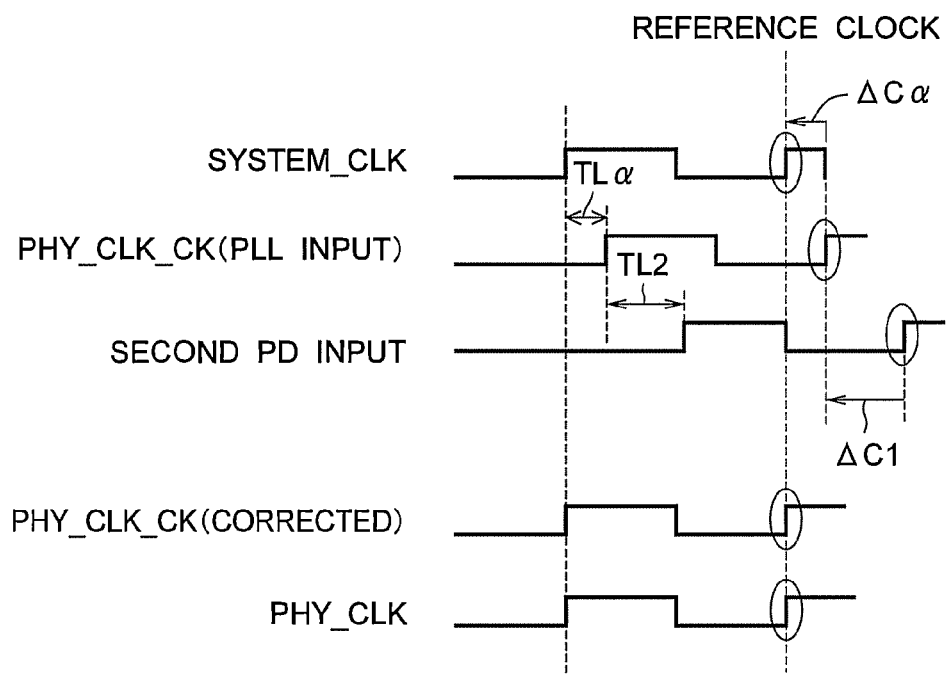
FIG. 12 is a signal waveform chart handled in the memory access apparatus 10 of the fourth embodiment.

The signals handled in the memory access apparatus of the fourth embodiment will be described. FIG. 12 is a signal waveform chart handled in the memory access apparatus 10 of the fourth embodiment.

As shown in FIG. 12, by the phase adjusting function of the PLL 141, the difference TLα in the delay amount between the system clock signal (SYSTEM_CLK) and the reference clock signal (PHY_CLK_CK) is corrected by the correction amount ΔCα. In this case, the reference clock seen from the PLL 141 is the system clock signal (SYSTEM_CLK).

The second PD input is delayed by the second clock tree length TL2 with respect to the PLL output at a certain time point. The second PD input is a signal outputted from the third phy-clock tree 153 when the second DLL 143 is not correcting the clock skew. The second clock tree length TL2 is longer than the first clock tree length TL1 and shorter than the third clock tree length TL3. This is because the third phy-clock tree 153 delays the second DLL output (DLL_OUT2) by the second clock tree length TL2 with respect to the PLL output. In this case, the second PD 147b generates the second detection signal (PD_OUT2) indicating that there is a phase difference worth the second clock tree length TL2 between the reference clock signal (PHY_CLK_CK) and the second PD input. The second DLL 143 then calculates the correction amount ΔC1 of the reference clock signal (PHY_CLK_CK) based on the second detection signal (PD_OUT2), and corrects the reference clock signal (PHY_CLK_CK) by the correction amount ΔC1 to generate the second DLL output (DLL_OUT2). The third phy-clock tree 153 then delays the second DLL output (DLL_OUT2) to generate the phy-clock signal (PHY_CLK). The phase of the phy-clock signal (PHY_CLK) thus becomes equal to that of the reference clock signal (PHY_CLK_CK).

According to the fourth embodiment, effects similar to the first embodiment to the third embodiment are obtained by the memory access apparatus 10 in which the first DLL 142 and the first PD 147a of the first embodiment to the third embodiment are omitted. Thus, the circuit scale of the memory access apparatus 10 can be reduced compared to the first embodiment to the third embodiment.

Incidentally, in the present embodiment, a plurality of DLLs may be combined for every byte when generating the data signal (DQ) and the strobe signal (DQS). In this case, the configuration of the DLLs to be combined may be the same or may be different from each other. For example, the first DLL 142 and the second DLL 143 may have the configuration of FIG. 5, and the third DLL 144 to the fifth DLL 146 may have the configuration of FIG. 8. In this case, the third DLL 144 to the fifth DLL 146 including the configuration of FIG. 8 may adjust a plurality of phases while suppressing the circuit area and maintaining the accuracy by acquiring the delay correction signal (DLL_CNT) from the first DLL 142 or the second DLL 143 having the configuration of FIG. 5.

Furthermore, in the present embodiment, an example in which the second logic circuit 149 outputs the data signal (DQ) and the data mask signal (DM) has been described, but the second logic circuit 149 may output only the data signal (DQ).

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A memory access circuit connected to a memory comprising a parallel interface and a system circuit configured to issue a memory access command to command access to the memory, the memory access circuit comprising:
   a phase locked loop configured to generate a PLL (Phase Locked Loop) output locked to a reference frequency of a reference signal;
   a first phy-clock tree configured to delay the PLL output and to generate a reference clock signal;
   a first delay locked loop configured to correct a clock skew between the reference clock signal and a system clock signal generated by the system circuit, and to generate a source signal of the system clock signal;
   a second delay locked loop configured to correct a clock skew between the reference clock signal and a phy-clock signal used in the memory access circuit, and to generate a source signal of the phy-clock signal;
   a first phase detector configured to detect a phase difference between the system clock signal and the phy-clock signal, and to generate a first detection signal corresponding to the phase difference;
   a second phase detector configured to detect a phase difference between the system clock signal and the phy-clock signal, and to generate a second detection signal corresponding to the phase difference; and
   a master delay locked loop configured to count the reference clock signal and to generate a delay correction signal, wherein
   the first delay locked loop determines a correction direction and a correction amount based on the first detection signal and the delay correction signal, respectively; and
   the second delay locked loop determines a correction direction and a correction amount based on the second detection signal and the delay correction signal, respectively.

2. The memory access circuit of claim 1, wherein
   at least one of the first delay locked loop and the second delay locked loop comprises,
   a plurality of reference phase multiplexers configured to select a plurality of reference phases in the reference clock signal,
   a selection phase multiplexer configured to select a selection phase in the reference clock signals,
   a plurality of delay element arrays configured to delay the reference clock signal of the reference phases and to generate a delayed reference clock signal of the reference phases,
   a DLL (Delay Locked Loop) output multiplexer configured to select one of the reference phases in the delayed reference clock signal, a phase comparator configured to compare the selection phase and the reference phase, and to generate a clock skew signal corresponding to a phase difference between the selection phase and the reference phase, and a delay controller configured to control the reference phase multiplexer, the selection phase multiplexer, and the DLL output multiplexer in such a manner that a phase to be selected is switched on the basis of the clock skew signal, and to adjust number of delay elements to be operated on the basis of the delay correction signal with respect to the delay element array.

3. The memory access circuit of claim 1, further comprising:

a second phy-clock tree configured to delay the reference clock signal and to generate a DLL (Delay Locked Loop) clock signal;

a third phy-clock tree configured to delay the output of the second delay locked loop and to generate the phy-clock signal;

a third delay locked loop configured to correct a clock skew between the reference clock signal and the DLL clock signal, and to generate a source signal of a strobe signal to be provided to the memory;

a fourth delay locked loop configured to correct a clock skew between the reference clock signal and the DLL clock signal, and to generate a source signal of a data clock to be provided to the memory; and a set angle calculating module configured to calculate a set angle to be provided to the third delay locked loop and the fourth delay locked loop based on the correction amount of the second delay locked loop; wherein the third delay locked loop and the fourth delay locked loop correct the clock skew based on the set angle.

4. The memory access circuit of claim 2, further comprising:

a second phy-clock tree configured to delay the reference clock signal and to generate a DLL (Delay Locked Loop) clock signal;

a third phy-clock tree configured to delay the output of the second delay locked loop and to generate the phy-clock signal;

a third delay locked loop configured to correct a clock skew between the reference clock signal and the DLL clock signal, and to generate a source signal of a strobe signal to be provided to the memory;

a fourth delay locked loop configured to correct a clock skew between the reference clock signal and the DLL clock signal, and to generate a source signal of a data clock to be provided to the memory; and a set angle calculating module configured to calculate a set angle to be provided to the third delay locked loop and the fourth delay locked loop based on the correction amount of the second delay locked loop; wherein the third delay locked loop and the fourth delay locked loop correct the clock skew based on the set angle.

5. The memory access circuit of claim 1, wherein at least one of the first delay locked loop and the second delay locked loop comprises, a reference phase multiplexer configured to select one reference phase in the reference clock signal, a delay element array configured to delay the reference clock signal of the reference phase and to generate a delayed reference clock signal, and a delay controller configured to control the reference phase multiplexer to switch a phase to be selected on the basis of the delay correction signal, and to adjust number of delay elements to be operated with respect to the delay element array.

6. The memory access circuit of claim 2, wherein the delay controller calculates the correction amount for every phase in the reference clock signal.

7. The memory access circuit of claim 4, wherein the delay controller calculates the correction amount for every phase in the reference clock signal.

8. The memory access circuit of claim 5, wherein the delay controller calculates the correction amount for every phase in the reference clock signal.

9. A memory access system comprising:

a memory comprising a parallel interface;

a system circuit configured to issue a memory access command to command an access to the memory; and a memory access circuit connected to the memory and the system circuit; wherein the memory access circuit comprises, a phase locked loop configured to generate a PLL (Phase Locked Loop) output locked to a reference frequency of a reference signal, a first phy-clock tree configured to delay the PLL output and to generate a reference clock signal, a first delay locked loop configured to correct a clock skew between the reference clock signal and a system clock signal generated by the system circuit, and to generate a source signal of the system clock signal, a second delay locked loop configured to correct a clock skew between the reference clock signal and a phy-clock signal used in the memory access circuit, and to generate a source signal of the phy-clock signal, a first phase detector configured to detect a phase difference between the system clock signal and the phy-clock signal, and to generate a first detection signal corresponding to the phase difference, a second phase detector configured to detect a phase difference between the system clock signal and the phy-clock signal, and to generate a second detection signal corresponding to the phase difference; and a master delay locked loop configured to count the reference clock signal and to generate a delay correction signal, wherein the first delay locked loop determines a correction direction and a correction amount based on the first detection signal and the delay correction signal, respectively; and the second delay locked loop determines a correction direction and a correction amount based on the second detection signal and the delay correction signal, respectively.

10. The memory access system of claim 9, wherein at least one of the first delay locked loop and the second delay locked loop comprises, a plurality of reference phase multiplexers configured to select a plurality of reference phases in the reference clock signal, a selection phase multiplexer configured to select a selection phase in the reference clock signals, a plurality of delay element arrays configured to delay the reference clock signal of the reference phases and to generate a delayed reference clock signal of the reference phases, a DLL (Delay Locked Loop) output multiplexer configured to select one of the reference phases in the delayed reference clock signal, a phase comparator configured to compare the selection phase and the reference phase, and to generate a clock skew signal corresponding to a phase difference between the selection phase and the reference phase, and a delay controller configured to control the reference phase multiplexer, the selection phase multiplexer, and the DLL output multiplexer in such a manner that a phase to be selected is switched on the basis of the clock skew signal, and to adjust number of delay elements to be operated on the basis of the delay correction signal with respect to the delay element array.

11. The memory access system of claim 9, further comprising:

a second phy-clock tree configured to delay the reference clock signal and to generate a DLL (Delay Locked Loop) clock signal;

a third phy-clock tree configured to delay the output of the second delay locked loop and to generate the phy-clock signal;

a third delay locked loop configured to correct a clock skew between the reference clock signal and the DLL clock signal, and to generate a source signal of a strobe signal to be provided to the memory;

a fourth delay locked loop configured to correct a clock skew between the reference clock signal and the DLL clock signal, and to generate a source signal of a data clock to be provided to the memory; and a set angle calculating module configured to calculate a set angle to be provided to the third delay locked loop and the fourth delay locked loop based on the correction amount of the second delay locked loop; wherein the third delay locked loop and the fourth delay locked loop correct the clock skew based on the set angle.

12. The memory access system of claim 10, further comprising:

a second phy-clock tree configured to delay the reference clock signal and to generate a DLL (Delay Locked Loop) clock signal;

a third phy-clock tree configured to delay the output of the second delay locked loop and to generate the phy-clock signal;

a third delay locked loop configured to correct a clock skew between the reference clock signal and the DLL clock signal, and to generate a source signal of a strobe signal to be provided to the memory;

a fourth delay locked loop configured to correct a clock skew between the reference clock signal and the DLL clock signal, and to generate a source signal of a data clock to be provided to the memory; and a set angle calculating module configured to calculate a set angle to be provided to the third delay locked loop and the fourth delay locked loop based on the correction amount of the second delay locked loop; wherein the third delay locked loop and the fourth delay locked loop correct the clock skew based on the set angle.

13. The memory access system of claim 9, wherein at least one of the first delay locked loop and the second delay locked loop comprises, a reference phase multiplexer configured to select one reference phase in the reference clock signal, a delay element array configured to delay the reference clock signal of the reference phase and to generate a delayed reference clock signal, and a delay controller configured to control the reference phase multiplexer to switch a phase to be selected on the basis of the delay correction signal, and to adjust number of delay elements to be operated with respect to the delay element array.

14. The memory access system of claim 10, wherein the delay controller calculates the correction amount for every phase in the reference clock signal.

15. The memory access system of claim 12, wherein the delay controller calculates the correction amount for every phase in the reference clock signal.

16. The memory access system of claim 13, wherein the delay controller calculates the correction amount for every phase in the reference clock signal.

17. A memory access circuit connected to a memory comprising a parallel interface and a system circuit configured to issue a memory access command to command access to the memory and to generate a system clock signal; the memory access circuit comprising:

a phase locked loop configured to generate a PLL (Phase Locked Loop) output locked to a reference frequency of a reference signal from the system clock signal;

a first phy-clock tree configured to delay the PLL output and to generate a reference clock signal;

a delay locked loop configured to correct a clock skew between the reference clock signal and a phy clock signal used in the memory access circuit and to generate a source signal of the phy-clock signal;

a phase detector configured to detect a phase difference between the reference clock signal and the phy-clock signal, and to generate a detection signal corresponding to the phase difference; and a master delay locked loop configured to count the reference clock signal and to generate a delay correction signal, wherein the delay locked loop determines a correction direction and a correction amount based on the detection signal and the delay correction signal, respectively.

18. The memory access circuit of claim 17, wherein at least one of the first delay locked loop and the second delay locked loop comprises, a plurality of reference phase multiplexers configured to select a plurality of reference phases in the reference clock signal, a selection phase multiplexer configured to select a selection phase in the reference clock signals, a plurality of delay element arrays configured to delay the reference clock signal of the reference phases and to generate a delayed reference clock signal of the reference phases, a DLL (Delay Locked Loop) output multiplexer configured to select one of the reference phases in the delayed reference clock signal, a phase comparator configured to compare the selection phase and the reference phase, and to generate a clock skew signal corresponding to a phase difference between the selection phase and the reference phase, and a delay controller configured to control the reference phase multiplexer, the selection phase multiplexer, and the DLL output multiplexer in such a manner that a phase to be selected is switched on the basis of the clock skew signal, and to adjust number of delay elements to be operated on the basis of the delay correction signal with respect to the delay element array.

19. The memory access circuit of claim 17, further comprising:

a second phy-clock tree configured to delay the reference clock signal and to generate a DLL (Delay Locked Loop) clock signal;

a third phy-clock tree configured to delay the output of the second delay locked loop and to generate the phy-clock signal;

a third delay locked loop configured to correct a clock skew between the reference clock signal and the DLL clock signal, and to generate a source signal of a strobe signal to be provided to the memory;

a fourth delay locked loop configured to correct a clock skew between the reference clock signal and the DLL clock signal, and to generate a source signal of a data clock to be provided to the memory; and a set angle calculating module configured to calculate a set angle to be provided to the third delay locked loop and the fourth delay locked loop based on the correction amount of the second delay locked loop; wherein the third delay locked loop and the fourth delay locked loop correct the clock skew based on the set angle.

20. The memory access circuit of claim 18, further comprising:

a second phy-clock tree configured to delay the reference clock signal and to generate a DLL (Delay Locked Loop) clock signal;

a third phy-clock tree configured to delay the output of the second delay locked loop and to generate the phy-clock signal;

a third delay locked loop configured to correct a clock skew between the reference clock signal and the DLL clock signal, and to generate a source signal of a strobe signal to be provided to the memory;

a fourth delay locked loop configured to correct a clock skew between the reference clock signal and the DLL clock signal, and to generate a source signal of a data clock to be provided to the memory; and a set angle calculating module configured to calculate a set angle to be provided to the third delay locked loop and the fourth delay locked loop based on the correction amount of the second delay locked loop; wherein the third delay locked loop and the fourth delay locked loop correct the clock skew based on the set angle.

\* \* \* \* \*